US012612300B2

(12) United States Patent
Fieglein et al.

(10) Patent No.: US 12,612,300 B2
(45) Date of Patent: Apr. 28, 2026

(54) SYSTEMS AND METHODS FOR MANAGING FUEL DISPENSER OPERATIONS USING A CLIENT DEVICE

(71) Applicant: Wayne Fueling Systems LLC, Austin, TX (US)

(72) Inventors: Henry Fieglein, Leander, TX (US); Rohith Chinnaswamy, RoundRock, TX (US); John Joseph Morris, Austin, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 1079 days.

(21) Appl. No.: 17/652,018

(22) Filed: Feb. 22, 2022

(65) Prior Publication Data

US 2022/0267137 A1 Aug. 25, 2022

Related U.S. Application Data

(60) Provisional application No. 63/152,169, filed on Feb. 22, 2021.

(51) Int. Cl.
B67D 7/34 (2010.01)
B67D 7/04 (2010.01)
(Continued)

(52) U.S. Cl.
CPC ............... B67D 7/348 (2013.01); B67D 7/04 (2013.01); G05B 19/042 (2013.01); G06Q 20/322 (2013.01); G06Q 20/3276 (2013.01); G06Q 20/34 (2013.01); G07F 9/001 (2020.05); G07F 9/002 (2020.05); G07F 9/009 (2020.05);
(Continued)

(58) Field of Classification Search
CPC ........ B67D 7/348; B67D 7/04; G05B 19/042; G05B 2219/23363; G06Q 20/322; G06Q 20/3276; G06Q 20/34; G06Q 20/18; G06Q 20/327; G06Q 20/385; G07F 9/001;
(Continued)

(56) References Cited

U.S. PATENT DOCUMENTS

| | | | | | |
|---|---|---|---|---|---|
| 6,152,591 | A | * | 11/2000 | McCall | .................... B67D 7/14 700/231 |
| 9,582,792 | B2 | * | 2/2017 | Bonk | ................. G06Q 20/3224 |

(Continued)

OTHER PUBLICATIONS

International Search Report and Written Opinion in International Application No. PCT/US22/70758, mailed on Jun. 1, 2022, 1-10 pages.

*Primary Examiner* — Michael Collins
(74) *Attorney, Agent, or Firm* — Mintz, Levin, Cohn, Ferris, Glovsky and Popeo, P.C.

(57) ABSTRACT

In one aspect, data characterizing a session during which fuel is to be dispensed from a fuel dispenser can be received from the fuel dispenser and by a client device of a user of the fuel dispenser. A fuel dispensing parameter characterizing an operational parameter of the fuel dispenser can be received at a field of a graphical interface displayed on the client device. A token characterizing a credential associated with the user for initializing the dispensing of the fuel during the session can be determined. An initialization of the dispensing of the fuel from the fuel dispenser can be authorized based on the determined token and the received fuel dispensing parameter.

25 Claims, 11 Drawing Sheets

(51) Int. Cl.

| | |
|---|---|
| *G05B 19/042* | (2006.01) |
| *G06Q 20/32* | (2012.01) |
| *G06Q 20/34* | (2012.01) |
| *G07F 9/00* | (2006.01) |
| *G07F 13/00* | (2006.01) |
| *G07F 13/02* | (2006.01) |
| *G07F 15/00* | (2006.01) |

(52) U.S. Cl.
CPC ............ *G07F 13/00* (2013.01); *G07F 13/025* (2013.01); *G07F 15/00* (2013.01); *G05B 2219/23363* (2013.01)

(58) Field of Classification Search
CPC .......... G07F 9/002; G07F 9/009; G07F 13/00; G07F 13/025; G07F 15/00
See application file for complete search history.

(56) References Cited

U.S. PATENT DOCUMENTS

| | | | | |
|---|---|---|---|---|
| 10,532,921 | B2 * | 1/2020 | Fieglein | ................. B67D 7/145 |
| 10,803,432 | B1 | 10/2020 | Miles | |
| 11,170,434 | B1 * | 11/2021 | Perry | ................. G06Q 30/0641 |
| 11,180,359 | B2 * | 11/2021 | Fieglein | ............... G06Q 20/047 |
| 11,697,581 | B2 * | 7/2023 | Sahota | ................... G06Q 50/40 |
| | | | | 222/52 |
| 12,411,931 | B2 * | 9/2025 | Hairston | ................. G06F 21/44 |
| 2001/0049626 | A1 * | 12/2001 | Nicholson | ........... G06Q 20/342 |
| | | | | 705/14.23 |
| 2013/0124855 | A1 | 5/2013 | Varadarajan et al. | |
| 2014/0074605 | A1 * | 3/2014 | Sanchez | ................. G06Q 40/03 |
| | | | | 705/14.64 |
| 2014/0074714 | A1 | 3/2014 | Melone et al. | |
| 2014/0246453 | A1 * | 9/2014 | Lin | ......................... G07F 17/18 |
| | | | | 222/23 |
| 2014/0351138 | A1 * | 11/2014 | Frieden | .................. G06Q 50/06 |
| | | | | 705/44 |
| 2015/0032558 | A1 * | 1/2015 | Bonk | ................... G06Q 20/202 |
| | | | | 705/21 |
| 2018/0105413 | A1 * | 4/2018 | Fieglein | ............... G07F 13/025 |
| 2019/0228480 | A1 * | 7/2019 | Williams | ............. B67D 7/0401 |
| 2019/0244205 | A1 * | 8/2019 | Fieglein | ............... G06Q 20/401 |
| 2026/0004268 | A1 * | 1/2026 | Gaudin | ............... G06Q 20/204 |

\* cited by examiner

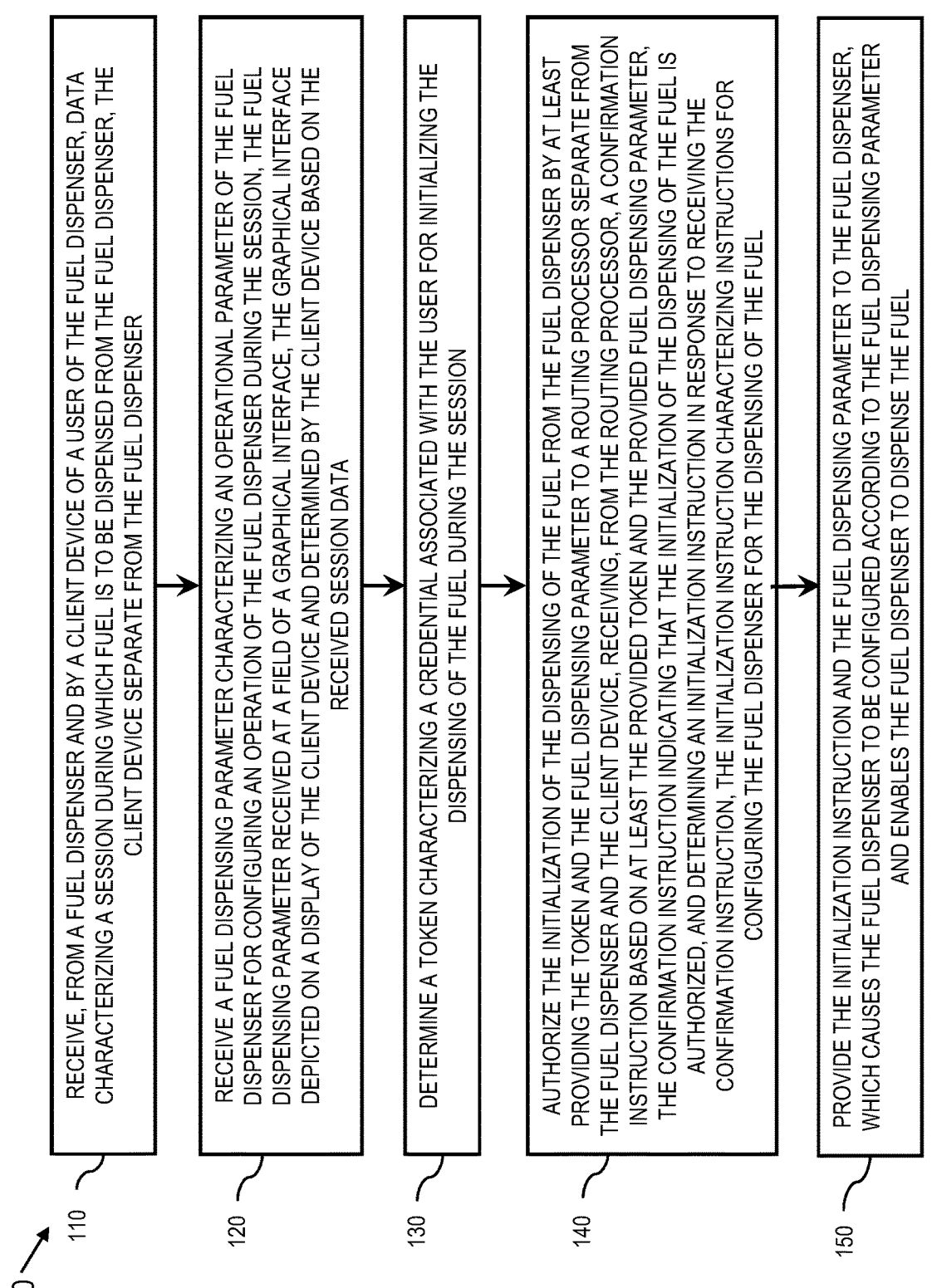

100

110 RECEIVE, FROM A FUEL DISPENSER AND BY A CLIENT DEVICE OF A USER OF THE FUEL DISPENSER, DATA CHARACTERIZING A SESSION DURING WHICH FUEL IS TO BE DISPENSED FROM THE FUEL DISPENSER, THE CLIENT DEVICE SEPARATE FROM THE FUEL DISPENSER

120 RECEIVE A FUEL DISPENSING PARAMETER CHARACTERIZING AN OPERATIONAL PARAMETER OF THE FUEL DISPENSER FOR CONFIGURING AN OPERATION OF THE FUEL DISPENSER DURING THE SESSION, THE FUEL DISPENSING PARAMETER RECEIVED AT A FIELD OF A GRAPHICAL INTERFACE, THE GRAPHICAL INTERFACE DEPICTED ON A DISPLAY OF THE CLIENT DEVICE AND DETERMINED BY THE CLIENT DEVICE BASED ON THE RECEIVED SESSION DATA

130 DETERMINE A TOKEN CHARACTERIZING A CREDENTIAL ASSOCIATED WITH THE USER FOR INITIALIZING THE DISPENSING OF THE FUEL DURING THE SESSION

140 AUTHORIZE THE INITIALIZATION OF THE DISPENSING OF THE FUEL FROM THE FUEL DISPENSER BY AT LEAST PROVIDING THE TOKEN AND THE FUEL DISPENSING PARAMETER TO A ROUTING PROCESSOR SEPARATE FROM THE FUEL DISPENSER AND THE CLIENT DEVICE, RECEIVING, FROM THE ROUTING PROCESSOR, A CONFIRMATION INSTRUCTION BASED ON AT LEAST THE PROVIDED TOKEN AND THE PROVIDED FUEL DISPENSING PARAMETER, THE CONFIRMATION INSTRUCTION INDICATING THAT THE INITIALIZATION OF THE DISPENSING OF THE FUEL IS AUTHORIZED, AND DETERMINING AN INITIALIZATION INSTRUCTION IN RESPONSE TO RECEIVING THE CONFIRMATION INSTRUCTION, THE INITIALIZATION INSTRUCTION CHARACTERIZING INSTRUCTIONS FOR CONFIGURING THE FUEL DISPENSER FOR THE DISPENSING OF THE FUEL

150 PROVIDE THE INITIALIZATION INSTRUCTION AND THE FUEL DISPENSING PARAMETER TO THE FUEL DISPENSER, WHICH CAUSES THE FUEL DISPENSER TO BE CONFIGURED ACCORDING TO THE FUEL DISPENSING PARAMETER AND ENABLES THE FUEL DISPENSER TO DISPENSE THE FUEL

DISPENSER
210

POS
251

CONTROL
SERVER
233

DISPENSER
210

311

CONTROL
SERVER
233

Figure 3E:
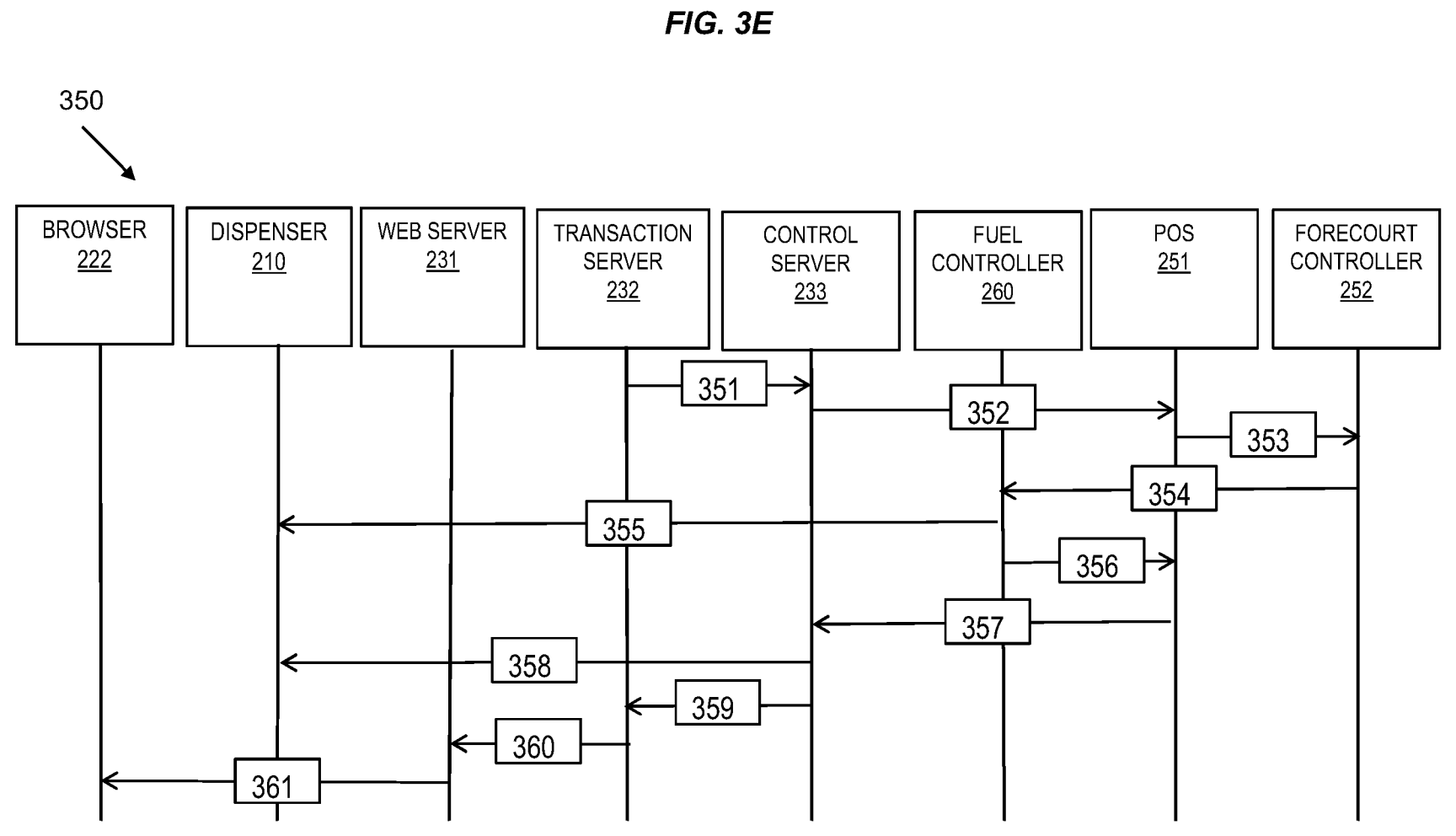

BROWSER 222

DISPENSER 210

WEB SERVER 231

TRANSACTION SERVER 232

CONTROL SERVER 233

FUEL CONTROLLER 260

POS 251

FORECOURT CONTROLLER 252

| BROWSER 222 | DISPENSER 210 | WEB SERVER 231 | TRANSACTION SERVER 232 | CONTROL SERVER 233 | RECEIPT DATABASE 235 | POS 251 |

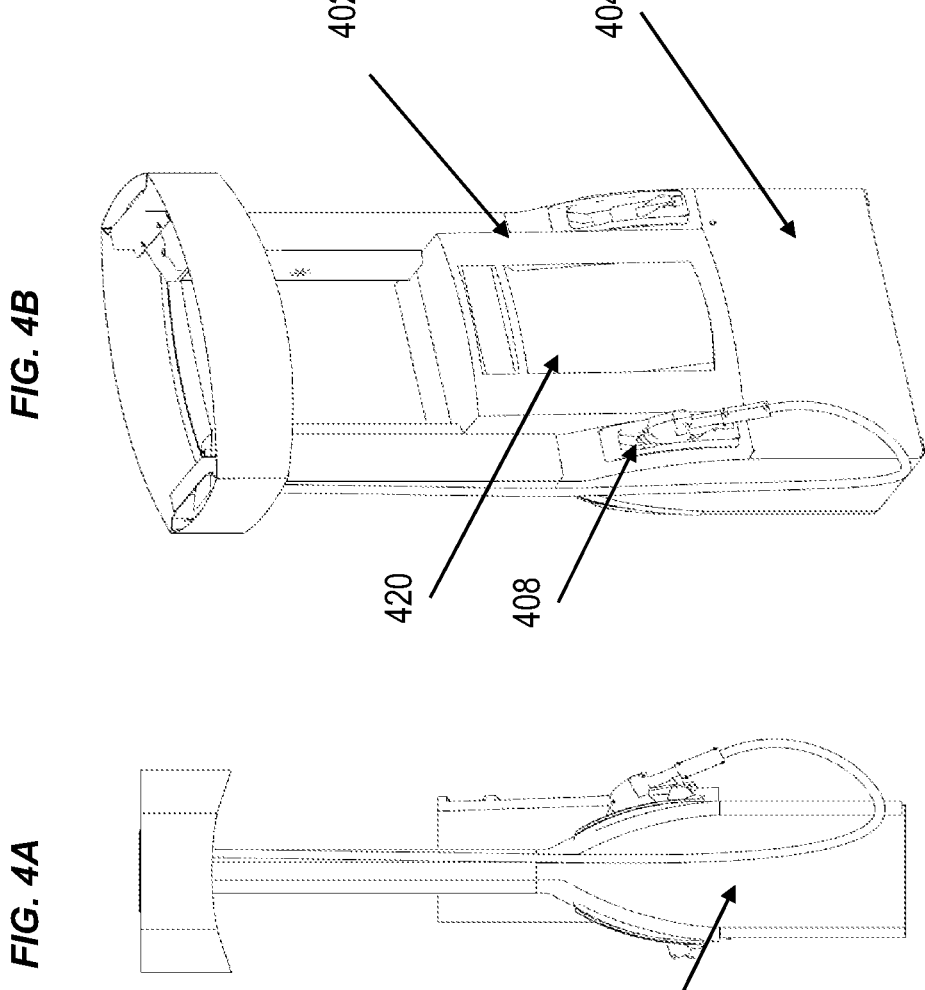
FIG. 4B
402
404
420
408
FIG. 4A
406
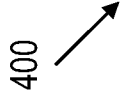
400

SYSTEMS AND METHODS FOR MANAGING FUEL DISPENSER OPERATIONS USING A CLIENT DEVICE

CROSS-REFERENCE TO RELATED APPLICATIONS

This application claims the benefit of priority under 35 U.S.C. § 119 to U.S. Provisional Application No. 63/152,169, filed on Feb. 22, 2021, the contents of which are hereby incorporated by reference in their entirety.

FIELD

Systems and methods are provided for managing fuel dispenser operations using a client device. Related apparatus, techniques, computer program products, and articles are also described.

BACKGROUND

In some fuel dispensing transactions, a user of a fuel dispenser wishing to purchase fuel from the fuel dispenser can provide payment information, which may be stored on a credit or debit card, to the fuel dispenser by inserting their credit or debit card into a card reader of the fuel dispenser. For example, a user of the fuel dispenser can provide their credit or debit card, containing their payment information, to a convenience store payment terminal at a fueling station, at which the fuel dispenser is located and with which the fuel dispenser is in operable communication, to complete the fuel dispensing transaction. And, in some fuel dispensing transactions, payment information for the dispensed fuel can be provided by a client device of the fuel dispenser user, for example by a mobile payment processing application or by wireless communication of data associated with the user's payment information stored in a digital wallet on the client device to the fuel dispenser. However, the payment information stored on the credit or debit card can be vulnerable to interception by various payment interception devices, such as a card-skimming device disposed on the fuel dispenser and configured to read the payment information stored in the credit or debit card when it is inserted into the card reader. And, in some instances, the payment information can be intercepted during the transmission of the payment information from the fuel dispenser to various payment processors for use in completing the fuel dispensing transaction.

In addition, in some fueling station transactions, the transaction is managed by the fuel dispenser user physically interacting with the fuel dispenser. In many instances, the fuel dispenser user is required to touch the controls of the fuel dispenser in order to operate the fuel dispenser. However, these surfaces may not be sanitary, and as a result, physically contacting those surfaces can contribute to an increased risk of disease transmission.

In addition, in some implementations, fuel dispensers and the existing hardware/software installed at fueling stations that are used to manage the operation of the fuel dispensers can utilize legacy technologies that require extensive customization and retrofitting to accommodate management of fuel dispenser operations by mobile devices of fuel dispenser users.

SUMMARY OF THE INVENTION

Systems and methods are provided for managing fuel dispenser operations using a client device. Related apparatus, techniques, and articles are also described.

In one aspect, data characterizing a session during which fuel is to be dispensed from a fuel dispenser can be received from the fuel dispenser and by a client device of a user of the fuel dispenser that is separate from the fuel dispenser. A fuel dispensing parameter characterizing an operational parameter of the fuel dispenser for configuring an operation of the fuel dispenser during the session can be received at a field of a graphical interface that can be depicted on a display of the client device and determined by the client device based on the received session data. A token characterizing a credential associated with the user for initializing the dispensing of the fuel during the session can be determined. An initialization of the dispensing of the fuel from the fuel dispenser can be authorized by at least providing the token and the fuel dispensing parameter to a routing processor separate from the fuel dispenser and the client device, receiving, from the routing processor, a confirmation instructed based on at least the provided token and the provided fuel dispensing parameter, the confirmation instruction indicating that the initialization of the dispensing of the fuel is authorized, and determining an initialization instruction in response to receiving the confirmation instruction, the initialization instruction characterizing instructions for configuring the fuel dispenser for the dispensing of the fuel. The initialization instruction and the fuel dispensing parameter can be provided to the fuel dispenser, which causes the fuel dispenser to be configured according to the fuel dispensing parameter and enables the fuel dispenser to dispense the fuel.

One or more of the following features can be included in any feasible combination. For example, the graphical interface can include a prompt to input the fuel dispensing parameter into the field, and the graphical interface can be provided to the display of the client device. The graphical interface can be provided to a display of the client device. For example, the fuel dispensing parameter can include at least one of a desired type of fuel, a desired grade of fuel, a desired amount of payment for the fuel, a desired amount of fuel to be dispensed from the fuel dispenser, a desired fuel additive, a desired product/service for sale, and data characterizing a loyalty program. For example, the session data can include a unique identifier that identifies the session, a fueling station unique identifier characterizing a fueling station at which the fuel dispenser is located, and a fueling point unique identifier characterizing a position of the fuel dispenser relative to the fueling station, the session can be characterized by a three-dimensional barcode determined by the fuel dispenser and depicted on a display of the fuel dispenser, and the client device can be configured to receive the three-dimensional barcode and to decode the session data from the received three-dimensional barcode. For example, a retrieval three-dimensional barcode characterizing instructions to cause an authorization of retrieval of the desired product/service for sale can be determined, and the retrieval three-dimensional barcode can be provided to the client device. For example, the token can be requested from a database of the client device, and the token can be provided by the client device based on an authentication of the fuel dispenser user determined by the client device. For example, after the fuel dispenser has completed the dispensing of the fuel, finalization request data characterizing a request to finalize the session can be received, finalization instructions can be determined based on the received finalization request data and in response to receipt of finalization data indicating that the session has been completed, and the finalization instructions can be provided to a fueling station terminal in operable communication with the fuel dispenser to cause the fueling station terminal to indicate that the session has been completed. For example, receipt data characterizing a record of the completed session can be received, a graphical representation of the receipt data can be determined for inclusion in the graphical interface, and the graphical representation of the receipt data can be provided to the client device for depiction in the graphical interface. For example, the received receipt data can be stored in a receipt database, a path characterizing a location of the receipt data stored in the receipt database can be determined, and the path can be provided to the client device for depiction in the graphical interface. For example, a transmission request characterizing a request to provide the stored receipt data to an external server can be received, an external receipt record including the stored receipt data can be determined based on the received transmission request, and the external receipt record can be provided to the external server. For example, a receipt report characterizing the received receipt data and additional receipt data previously stored in the receipt database can be determined, the receipt report can be provided to the fueling station terminal, and the fueling station terminal can have a graphical user interface configured to display the receipt report. For example, the fuel dispenser can form a part of a plurality of associated fuel dispensers having associated sessions, and the unique identifier can identify the session from a plurality of sessions.

In another aspect, a system is provided and can include at least one data processor and memory storing instructions configured to cause the at least one data processor to perform operations described herein. The operations can include receiving, from a fuel dispenser and by a client device of a user of the fuel dispenser, data characterizing a session during which fuel is to be dispensed from the fuel dispenser, the client device separate from the fuel dispenser; receiving a fuel dispensing parameter characterizing an operational parameter of the fuel dispenser for configuring an operation of the fuel dispenser during the session, the fuel dispensing parameter received at a field of a graphical interface, the graphical interface depicted on a display of the client device and determined by the client device based on the received session data; determining a token characterizing a credential associated with the user for initializing the dispensing of the fuel during the session; authorizing the initialization of the dispensing of the fuel from the fuel dispenser by at least providing the token and the fuel dispensing parameter to a routing processor separate from the fuel dispenser and the client device, receiving, from the routing processor, a confirmation instruction based on at least the provided token and the provided fuel dispensing parameter, the confirmation instruction indicating that the initialization of the dispensing of the fuel is authorized, and determining an initialization instruction in response to receiving the confirmation instruction, the initialization instruction characterizing instructions for configuring the fuel dispenser for the dispensing of the fuel; and providing the initialization instruction and the fuel dispensing parameter to the fuel dispenser, which causes the fuel dispenser to be configured according to the fuel dispensing parameter and enables the fuel dispenser to dispense the fuel.

One or more of the following features can be included in any feasible combination. For example, the operations can further include providing the graphical interface to the display of the client device, and the graphical interface can include a prompt to input the fuel dispensing parameter into the field. For example, the fuel dispensing parameter can include at least one of a desired type of fuel, a desired grade of fuel, a desired amount of payment for the fuel, a desired amount of fuel to be dispensed from the fuel dispenser, a desired fuel additive, a desired product/service for sale, and data characterizing a loyalty program. For example, the session data includes a unique identifier that identifies the session, a fueling station unique identifier characterizing a fueling station at which the fuel dispenser is located, and a fueling point unique identifier characterizing a position of the fuel dispenser relative to the fueling station, the session can be characterized by a three-dimensional barcode determined by the fuel dispenser and depicted on a display of the fuel dispenser, and the client device can be configured to receive the three-dimensional barcode and to decode the session data from the received three-dimensional barcode. For example, the operations can further include determining a retrieval three-dimensional barcode characterizing instructions to cause an authorization of retrieval of the desired product/service for sale; and providing the retrieval three-dimensional barcode to the client device. For example, the token can be requested from a database of the client device, and the token can be provided by the client device based on an authentication of the fuel dispenser user determined by the client device. For example, the operations can further include, after the fuel dispenser has completed the dispensing of the fuel, receiving finalization request data characterizing a request to finalize the session; determining finalization instructions based on the received finalization request data, the finalization instructions determined in response to receipt of finalization data indicating that the session has been completed; and providing the finalization instructions to a fueling station terminal in operable communication with the fuel dispenser to cause the fueling station terminal to indicate that the session has been completed. For example, the operations can further include receiving receipt data characterizing a record of the completed session; determining a graphical representation of the receipt data for inclusion in the graphical interface; and providing the graphical representation of the receipt data to the client device for depiction in the graphical interface. For example, the operations can further include storing the received receipt data in a receipt database; determining a path characterizing a location of the receipt data stored in the receipt database; and providing the path to the client device for depiction in the graphical interface. For example, the operations can further include receiving a transmission request characterizing a request to provide the stored receipt data to an external server; determining an external receipt record based on the received transmission request, the external receipt record including the stored receipt data; and providing the external receipt record to the external server. For example, the operations can further include determining a receipt report characterizing the received receipt data and additional receipt data previously stored in the receipt database; and providing the receipt report to the fueling station terminal, and the fueling station terminal can have a graphical user interface configured to display the receipt report. For example, the fuel dispenser can form a part of a plurality of associated fuel dispensers having associated sessions, and the unique identifier can identify the session from a plurality of sessions.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 1 is a process flow diagram illustrating an example process of some implementations of the current subject matter that can provide for managing fuel dispenser operations using a client device;

FIG. 3A is a data flow diagram illustrating the transfer of data between the system components illustrated in FIG. 2 when the system of FIG. 2 is initialized to begin operations;

FIG. 3B is a data flow diagram illustrating the transfer of data between the system components illustrated in FIG. 2 after the system of FIG. 2 has been initialized and during the period time in which the system of FIG. 2 is waiting for a fuel dispenser user to engage a fuel dispenser to begin a session in which fuel is dispensed from the fuel dispenser;

FIG. 3D is a data flow diagram illustrating the transfer of data between the system components illustrated in FIG. 2 during the authorization of the transaction that occurs during the session;

FIG. 3E is a data flow diagram illustrating the transfer of data between the system components illustrated in FIG. 2 during the authorization of the fuel dispensing operation that occurs during the session;

FIG. 3F is a data flow diagram illustrating the transfer of data between the system components illustrated in FIG. 2 after fueling has been completed;

FIG. 3G is a data flow diagram illustrating the transfer of data between the system components illustrated in FIG. 2 when a receipt characterizing the transaction that occurred during the session is provided to a client device in operable communication with the fuel dispenser;

FIG. 4A is a side perspective view of one embodiment of a fuel dispenser;

FIG. 4B is a front perspective view of the fuel dispenser shown in FIG. 4A; and

Figure 2:
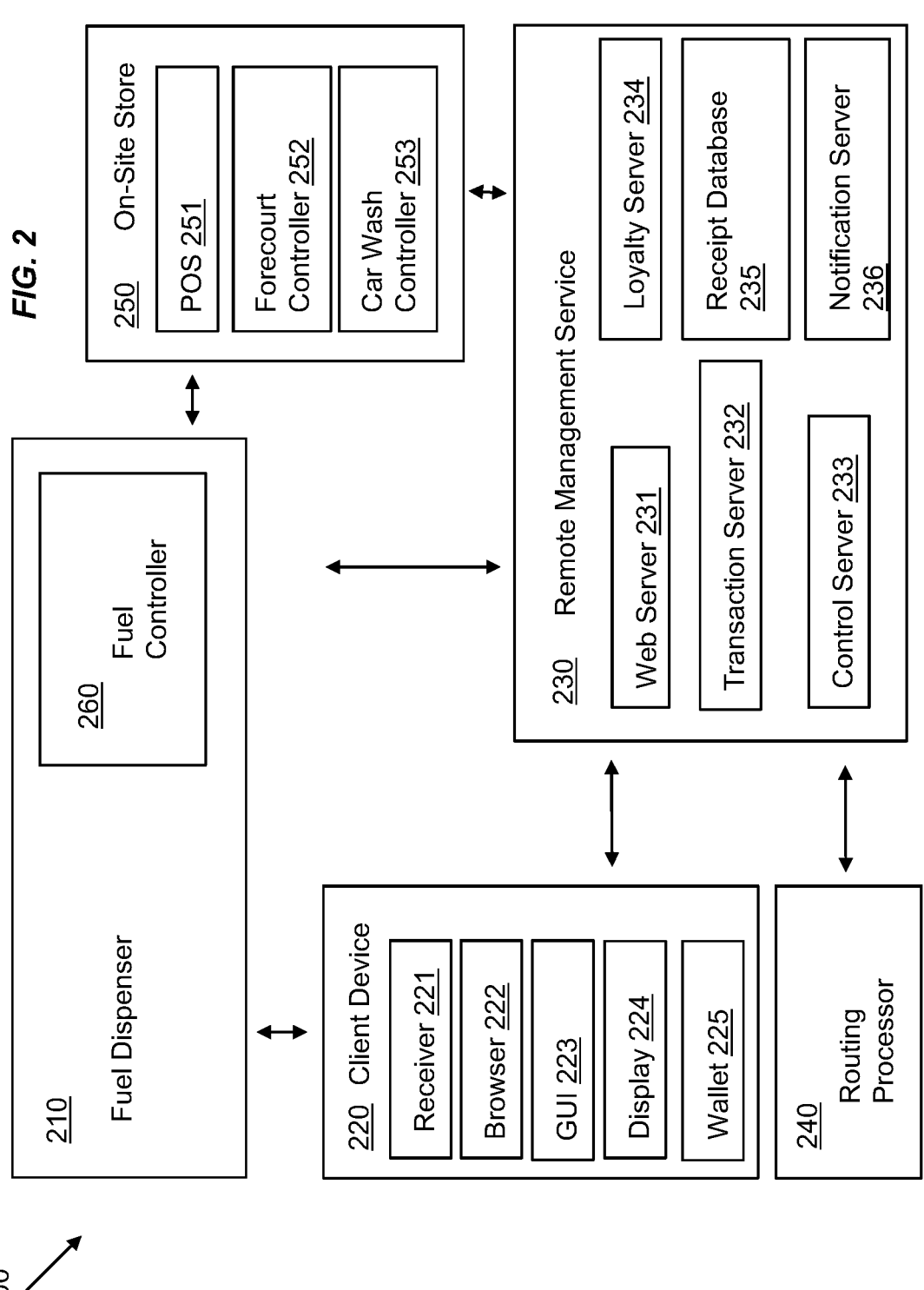
FIG. 2 is a schematic diagram of an exemplary system for implementing the current subject matter, as shown and described herein.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Current forms of interacting with a fuel dispenser are susceptible to insecure payment processing and are not sanitary as they typically require users to provide their payment information to the fuel dispenser during the interaction and/or physically touch high-use surfaces (such as buttons and/or a display) on the fuel dispenser.

The current subject matter includes a methodology that, in some implementations, can provide for managing fuel dispenser operations using a client device that can include a remote exchange of payment credentials and one or more fuel dispensing parameters. For example, in some implementations, payment credentials (such as a token from a digital wallet, a login credential, and/or the like) and fuel dispensing parameters (such as a desired type/grade of fuel, a desired amount of fuel, a desired fuel purchase price amount, a desired fuel additive, a desired product or service offered in conjunction with the dispensed fuel, and the like) can be input into an interface operated on the client device, which can send the credentials and a unique transaction identifier (received from the fuel dispenser in the form of a three-dimensional barcode, such as a quick reference ("QR") code), to a remote service separate from the fuel dispenser and the client device. The remote service can process the payment credentials to authorize the transaction and provide instructions that include the fuel dispensing parameters to the fuel dispenser which, when received, can configure the operation of the fuel dispenser (e.g., by configuring the amount of fuel to be dispensed, additives to be added to the fuel, and the like).

By remotely exchanging the payment credentials and fuel dispensing parameters, thereby avoiding various payment interception devices (e.g., card skimming devices and the like), some implementations of the current subject matter can provide for more secure, centralized payment processing can reduce the number of entities that handle payment processing data and thereby the number of opportunities for payment interception. Moreover, by remotely exchanging payment credentials and fuel dispensing parameters, some implementations of the current subject matter can reduce or eliminate the need for a user to touch high-use portions of the fuel dispenser (e.g., buttons and/or regions of the fuel dispenser display), thereby improving sanitation and reducing the spread of disease.

FIG. 1 is a process flow diagram illustrating an example process 100 that can provide for management of fuel dispenser operations using a client device.

At 110, data characterizing a session during which fuel is to be dispensed from a fuel dispenser can be received from the fuel dispenser and from the client device of the user. The client device can be separate from the fuel dispenser. The client device can include, for example, a mobile device of the user of the fuel dispenser, such as a smartphone, a tablet (e.g., iPad), or any other mobile device that is configured to operate a web browser via a graphical interface. In some implementations, the client device can include a vehicle head unit that is integrated into the user's vehicle and that includes a display configured to present a graphical interface and to permit the user to operate a web browser on the vehicle head unit via the graphical interface.

In some implementations, the session data can characterize a unique identifier, generated by the fuel dispenser that can identify the session in which the fuel is to be dispensed from the fuel dispenser. In some implementations, wherein the fuel dispenser forms part of a plurality of associated fuel dispensers at the fueling station having associated sessions, the unique identifier can identify the session from the plurality of associated sessions. In some implementations, the session data can characterize a site unique identifier that identifies the fueling station at which the fuel dispenser is located. In some implementations, the session data can characterize a fueling point unique identifier that identifies the fuel dispenser relative to other fuel dispensers at the fueling station.

In some implementations, the fuel dispenser can encode the session data into a three-dimensional barcode (e.g., a quick reference or "QR" code) and provide the three-dimensional barcode to a display of the fuel dispenser. In some implementations, the three-dimensional barcode can also encode a uniform resource locator of a web server associated with a payment management service, as explained in further detail below. The client device can then acquire the three-dimensional barcode from the display of the fuel dispenser when activated to do so by the user by, for example, activating an image sensor (e.g., a camera) of the client device. The client device can decode the session data and the uniform resource locator from the acquired three-dimensional barcode for further use, as explained below.

In some implementations, the session data and/or the uniform resource locator described above can be transmitted by the fuel dispenser via near field communication (NFC) to the client device. In such an implementation, the user can position the client device in proximity to an NFC transceiver of the fuel dispenser that is configured to transmit the session data (including unique identifier, the site unique identifier, and/or the fueling point unique identifier), and/or the uniform resource locator, and the client device can then acquire the unique identifier, the site unique identifier, the fueling point unique identifier, and/or the uniform resource locator from the NFC transceiver once it is positioned within range of the NFC transceiver.

At 120, a fuel dispensing parameter can be received. The fuel dispensing parameter can characterize an operational parameter of the fuel dispenser to configure operation of the fuel dispenser during a session in which fuel is to be dispensed from the fuel dispenser. For example, the fuel dispensing parameter can include at least one of a desired type of fuel (e.g., gasoline, diesel, etc.), a desired grade of fuel, a desired amount of payment for the fuel, a desired amount of fuel to be dispensed from the fuel dispenser, a desired fuel additive, a desired product/service for sale, and data characterizing a loyalty program. In some implementations, the fuel dispensing parameter can be received as an input from the user to the client device that is associated with the user. The input can be provided by the user by interacting with a graphical interface presented on a display of the client device, such as one or more of the graphical interfaces described above.

In some implementations, the content that is presented in the graphical interface via the display of the client device can be determined based on the received session data. For example, the unique identifier that is characterized by the session data can be used to initiate the process of generating the graphical interface. The input can include at least one of a numerical value characterizing the desired amount of payment for the fuel, a numerical value characterizing desired amount of fuel to be dispensed from the fuel dispenser, a selection of an available fuel additive, a selection of an available product/service for sale, and a string associated with a user's loyalty program account. In some implementations, the graphical interface can include a field for receiving the input and a prompt to instruct the user to provide the input to the field.

As mentioned above, in some implementations, the client device can include a vehicle head unit that is integrated into the user's vehicle and that includes a display configured to present a graphical interface and that permits the user to operate a web browser on the vehicle head unit via the graphical interface. The vehicle head unit can also be configured to receive input from the user that is responsive to or otherwise based on content provided in the graphical interface. In some implementations, a wireless connection, such as a wireless connection that is configured to transmit data via the Bluetooth protocol, can be established between the vehicle head unit and the fuel dispenser. Once the wireless connection is established, the fuel dispenser can transmit the session data (including unique identifier, the site unique identifier, and/or the fueling point unique identifier) and/or the uniform resource locator to the vehicle head unit via the wireless connection.

After the client device has received and/or decoded the session and the uniform resource locator, the client device can generate an instruction to launch the uniform resource locator in the web browser of the client device and to provide the unique identifier to a web server configured to interface with the web browser of the client device once the uniform resource locator is launched. The web server can be further configured to generate data characterizing content to be presented on the client device (via the web browser of the client device) and to provide the content to the client device for presentation on the display of the client device via the graphical interface. The data characterizing the content can be generated by the web server based on data received via an application programming interface ("API") from other servers/components described herein.

The unique identifier can be provided by the web server to a transaction server, which can pass the unique identifier to a control server. In some implementations, the control server can be configured to authorize a transaction at an individual fueling point (such as a fuel dispenser) by directly communicating with the individual fueling point. In some implementations, the control server can be configured to authorize a transaction at an individual fueling point by interacting with a fueling station forecourt controller that is in operable communication with the individual fueling point and the control server. In some implementations, the control server can also be configured to provide data characterizing a message for display on a display of the fuel dispenser to inform the customer of the actions required in order to execute the fuel transaction (e.g., to lift the fuel dispenser nozzle from the fuel dispenser, to select a fuel grade for dispensing from the fuel dispenser, etc.).

In some implementations, the transaction server can be configured to identify and authorize a transaction with servers affiliated with acquiring merchants. In some implementations, the transaction server can identify a fuel transaction and request a fuel transaction authorization from the control server for use in authorizing the fuel transaction.

In some implementations, the control server can compare the unique identifier with a copy of the unique identifier received by the control server from the fuel dispenser in a separate transmission and thereby validate the unique identifier. The control server can generate data characterizing a request to reserve the fuel dispenser for the session, and the control server can provide the request to a point-of-sale device. In response to receiving the request to reserve the fuel dispenser, the point-of-sale device can reserve the fuel dispenser for the session and transmit data characterizing the fuel dispenser reservation to the control server. The control server can provide the fuel dispenser reservation data to the transaction server, which can pass the fuel dispenser reservation data to the web server. In response to receiving the fuel dispenser reservation data, the web server can generate the content for presenting on the display of the client device via the graphical interface, including the aforementioned fields. The web server can provide the content to the web browser of the client device, which can display the content on the display of the client device via the graphical interface.

At 130, a token characterizing a credential associated with the user for initializing the dispensing of the fuel during the session can be determined. In some implementations, after providing the aforementioned input(s) to the graphical interface, the user can interact with the graphical interface to select a method of payment for the fuel to be dispensed during the session. In response to receiving the payment method selection from the user, the web browser can request the token from the digital payment database of the client device. In order to issue the token to the web browser, the digital payment database must authenticate the request, and can do so by requesting a security credential from the user (e.g., biometric fingerprint, passcode, etc.). In response to receiving an acceptable security credential from the user, the digital payment database can provide the token to the web browser, which can provide the token to the web server for further processing, as explained in further detail below.

In some implementations, the token can include a string of randomly-generated numbers. In some implementations, the string of randomly-generated numbers can be encrypted using, for example, 128-bit encryption. The string of randomly-generated numbers can be associated with a primary account number that characterizes payment information of the user. In some implementations, the payment information of the user can be stored in a digital payment database that is stored in a memory of the client device. For example, the digital payment database can include a digital wallet that securely stores the payment information on the client device.

At 140, the initialization of the dispensing of the fuel from the fuel dispenser can be authorized. The authorization can include at least providing the token and the fuel dispensing parameter received from the client device to a routing processor separate from the fuel dispenser and the client device. For example, in some implementations, in response to receiving the token from the browser of the client device, the web server can provide a payment authorization request that that includes the token and the fuel dispensing parameter to the transaction server, which can in turn pass the payment authorization request to an external processor for further processing, such as the routing processor. In some implementations, the routing processor can include a payment switch configured to interact with payment-issuing and merchant banks and thereby manage payment to a merchant bank affiliated with the fueling station for the fuel/additives/products/services/etc. purchased during the session. For example, in some implementations, the payment switch can be configured to ascertain an authorization, from a payment-issuing bank holding an account of the user that corresponds to the token provided by the client device, indicating that the account has sufficient funds to pay for the fuel to be dispensed and/or any additional products/services selected by the user when using the graphical interface.

The authorization can include at least receiving a confirmation instruction from the routing processor based on at least the provided token and the provided fuel dispensing parameter. In some implementations, the confirmation instruction can be generated by the routing processor in response to determining that the account associated with the provided token at the payment-issuing bank has sufficient funds to pay for the desired fuel/additives/products/services/etc. requested for purchase during the session and that are characterized by the provided fuel dispensing parameter. In some implementations, as a result of this determination, the confirmation instruction can indicate that the initialization of the dispensing of the fuel by the fuel dispenser is authorized. The routing processor can provide the confirmation instruction to the transaction server.

The authorization can include at least determining an initialization instruction in response to receiving the confirmation instruction. For example, in some implementations, the transaction server can determine an initialization instruction for sending to the fuel dispenser in response to receiving the confirmation instruction, and the initialization instruction can include data characterizing commands for configuring the fuel dispenser for the dispensing of the fuel and to cause the fuel dispenser to be configured according to the fuel dispensing parameter.

At 150, the initialization instruction and the fuel dispensing parameter can be provided to the fuel dispenser, which causes the fuel dispenser to be configured according to the fuel dispensing parameter and enables the fuel dispenser to dispense the fuel. In some implementations, the initialization instruction can be provided to the control server. The control server can provide the initialization instruction to the client device and to the point-of-sale device to facilitate activation of the fuel dispenser for fueling.

In some implementations, when the dispensing of the fuel is complete, the point-of-sale device can generate a request to finalize the session and provide the finalization request to the control server. The control server can pass the finalization request to the transaction server, which can interact with the routing processor to finalize payment to the merchant bank for the fuel dispensed during the session. Once the routing processor has settled payment to the merchant bank associated with the fueling station, the routing processor can generate a finalization instruction that indicates the settling of the payment and provide the finalization instruction to the transaction server, which can pass the finalization instruction to the point-of-sale device. In response to receiving the finalization instruction, the point-of-sale device can indicate to an operator of the fueling station that the session has been completed and that payment has been settled.

In some implementations, a receipt characterizing the session can be generated and provided to the client device. For example, the point-of-sale device can provide session data characterizing the completed session to the control server, which can use the session data to generate receipt data that characterizes a record of the completed session. The control server can provide the receipt data to the transaction server, which can provide the receipt data to the web server. The web server can generate a graphical depiction of the receipt data and provide the graphical depiction to the web browser of the client device for display, via the graphical interface, on the display of the client device. In some implementations, the control server can provide the receipt data to a receipt database for storage therein. The receipt database can determine a path that characterizes a location of the receipt data stored in the receipt database and provide the path to the control server. The control server can provide the path to the transaction server, which can pass the path to the web server. The web server can provide the path to the client device for depiction in the graphical interface and viewing by the user on the display of the client device.

In some implementations, wherein the user has purchased a product/service available at the fueling station in addition to fuel, a retrieval three-dimensional barcode can be determined. The retrieval three-dimensional barcode can encode instructions to cause an authorization of retrieval of the product/service. The retrieval three-dimensional barcode can be provided to the client device, and the client device can display the retrieval three-dimensional barcode such that the retrieval three-dimensional barcode can be presented to a three-dimensional barcode reader in operable communication with a terminal used to provide the product/service. For example, when the product/service is a car wash visit at a car wash facility at or near the fueling station, the retrieval three-dimensional barcode can encode instructions that permit the activation of the car wash facility in accordance with the car wash services previously purchased by the user. The user can present the client device, having the retrieval three-dimensional barcode displayed on the display of the client device, to a three-dimensional barcode reader communicatively coupled to the car wash, which can activate the car wash after scanning the retrieval three-dimensional barcode.

In another example, when the product/service is a convenience store item that is available for purchase at a convenience store at/near the fueling station, the retrieval three-dimensional barcode can encode information that characterizes a proof of purchase of the convenience store item that was previously purchased by the user. The user can present the client device, having the retrieval three-dimensional barcode displayed on the display of the client device, to a three-dimensional barcode reader communicatively coupled to a convenience store point-of-sale device at the convenience store at which the convenience store item is located, which can scan the retrieval three-dimensional barcode and decode the proof of purchase information. The decoded proof of purchase information can be provided to the point-of-sale device by the three-dimensional barcode reader, which can generate a notification, for presentation on a display of the point-of-sale device, that indicates the user is authorized to retrieve the convenience store item.

In some implementations, the generated receipt data can be provided to a user's email address. For example, the graphical interface can include a field for the user to input their email address and a prompt that instructs the user to input their email address into the field. After receiving the email address at the field, the web browser can provide the email address to the web server, which can provide the email address to a notification service in operable communication with the web server. The notification service can provide the receipt data to the email address once the email address is received from the web server.

In some implementations, the receipt data, and additional receipt data previously stored in the receipt database, can be used in the generation of a receipt report that aggregates the receipt data corresponding to the session with historical receipt data from historical sessions. The receipt report can be provided to the point-of-sale device for presentation on the display of the point-of-sale device for review by fueling station attendants and/or management.

In some implementations, the current subject matter can be implemented in a system 200, as shown in FIG. 2. The system 200 can include one or more of a fuel dispenser 210, a client device 220, a remote management service 230, a routing processor 240, an on-site store 250, and a fuel controller 260.

In some implementations, the fuel dispenser 210 can be configured to dispense fuel and can include at least one data processor, memory, and an input/output device, and each can be configured to perform one or more aspects of the fuel dispenser functionality described herein. As shown and described herein, the fuel dispenser 210 can include components and programming that enable the fuel dispenser to provide fuel to a user and to facilitate payment for the fuel dispensed. In some implementations, the fuel dispenser can include components and programming that enable the fuel dispenser to provide the fuel, and the fuel dispenser can operate in conjunction with a payment terminal that includes components and programming configured to perform the payment and transaction functionalities described herein.

In some implementations, the client device 220 can be in operable communication with the fuel dispenser 210 and can include at least one data processor, memory, and an input/output device, and each can be configured to perform one or more aspects of the client device functionality described herein. As shown in FIG. 2, the client device 220 can include a receiver 221, such as a three-dimensional barcode scanner (e.g., a camera or image sensor), a near-field communication transceiver, and/or a wireless communications transceiver (e.g., a Bluetooth transceiver) that is configured to acquire data from the fuel dispenser 210 (such as a three-dimensional barcode encoding the above-described session data and/or the above-described session data). The client device 220 can also include a browser 222 that is configured to provide data characterizing the operation of the fuel dispenser 210 and other data types as shown and described herein to a graphical interface (GUI) 223, and to receive user inputs for selecting fuel dispenser operation parameters that are made by the user via the graphical interface (GUI) 223. The graphical interface 223 can be displayed on a display 224 of the client device 220. The client device 220 can also include a digital wallet 225 that is configured to store payment information of the user and to provide at least one token characterizing the payment information to the browser upon receiving a request from the browser and after an authentication of the user.

In some implementations, the remote management service 230 can be in operable communication with the fuel dispenser 210 and the client device 220 and can include one or more servers configured to perform one or more aspects of the server and database functionality described herein. As shown in FIG. 2, the remote management service 230 can include a web server 231, a transaction server 232, a control server 233, a loyalty server 234, a receipt database 235, and a notification server 236. The web server 231 can be configured to generate web content for presentation on the client device 220. The transaction server 232 can be configured to process the token received from the client device 220 in accordance with the functionality and operations described herein. The control server 233 can be configured to manage the operation of the processes and operations as described elsewhere herein. The loyalty server 234 can be configured to store loyalty program account information associated with the user and to provide data characterizing available promotions/discounts that are available to the user in accordance with any applicable loyalty programs. The receipt database 235 can be configured to receive receipt data that characterizes records of fuel dispenser sessions and to generate aggregate reports that include aggregated data characterizing fuel dispenser sessions. The notification server 236 can be configured to receive the receipt data and to provide the receipt data to an external address (e.g., an email address) based on inputs (e.g., an email address) provided via graphical interface 223 of the client device 220.

Although these servers and databases are shown as separate components within the remote management service 230, the functionalities performed by these separate servers and databases can be performed by a single server or database, or by any combination of servers and/or databases as required to ensure compatibility with existing/legacy components at fueling points/fueling stations, to maintain operational capacity in the event of service outages, and to improve the reliability of the systems and components described herein.

As mentioned above, the system 200 can include a routing processor 240 that is in operable communication with the remote management service 230. In some implementations, the routing processor can be a payment switch that is configured to manage the completion of payment for the fuel, products, and/or services purchased by the user during the session. As shown in FIG. 2, the routing processor 240 can be an external processor that is separate from the remote management service 230. However, in some implementations, the routing processor 240 can be incorporated into the remote management service 230.

In addition, as mentioned above, in some implementations the system 200 can include an on-site store 250 that is located at or near the fueling station at which the fuel dispenser 210 is located. The on-site store 250 can include products and/or services that are offered for sale by the fueling station in addition to fuel, such as convenience store items, restaurant service, and car wash services. As shown in FIG. 2, the on-site store 250 can include a point-of sale ("POS") device 251 that includes at least one data processor that is configured to manage payment for the items in the on-site store 250 and to facilitate the dispensing of fuel from the fuel dispenser 210 in accordance with the functionality described herein. In addition, the on-site store 250 can include a forecourt controller 252 that includes at least one data processor configured to facilitate the management of the fuel dispenser 210 in accordance with the functionality described herein. Finally, the on-site store 250 can also include a car wash controller 253 that includes at least one data processor that is configured to operate a car wash in accordance with the functionality described herein. In some implementations, the POS 251, the forecourt controller 252, and/or the car wash controller 253 can be in operable communication with the remote management service 230 and can be configured to receive and transmit data characterizing operating instructions for various components of the system 200 in accordance with the functionality described herein.

In addition, as mentioned above, in some implementations, the system 200 can include a fuel controller 260 that can be incorporated into the fuel dispenser 210 and that can include at least one data processor configured to manage the dispensing of the fuel from the fuel dispenser 210 in accordance with the functionality described herein. In some implementations, the fuel controller 260 is configured to manage the operation of components of the fuel dispenser 210 (e.g., hydraulic components) and to measure the amount of fuel that is dispensed from the fuel dispenser 210. In some implementations, the fuel controller 260 can be in operable communication with one or more of the POS device 251 and the forecourt controller 252 of the on-site store 250, and can be configured to receive data from the POS device 251 and/or the forecourt controller 252 that characterizes instructions for controlling the dispensing of fuel from the fuel dispenser 210. In some implementations, the forecourt controller 252 is configured to interface with the fuel controller 260 and the POS device 251 and to provide an interface between the fuel controller 260 and the POS device 251. In operation, the forecourt controller can receive a request to authorize a fuel amount (or, in some implementations, a dollar amount equal to a desired fuel amount) at a particular fueling point/fuel dispenser and can translate the requested amount into commands which the fuel controller can accept to enable the dispensing of fuel. In some implementations, the POS device 251 can authorize a sales transaction based on a pre-authorization amount that the customer indicates via their interactions with the browser 222 of the client device or that the merchant sets as a maximum.

Figure 3A:
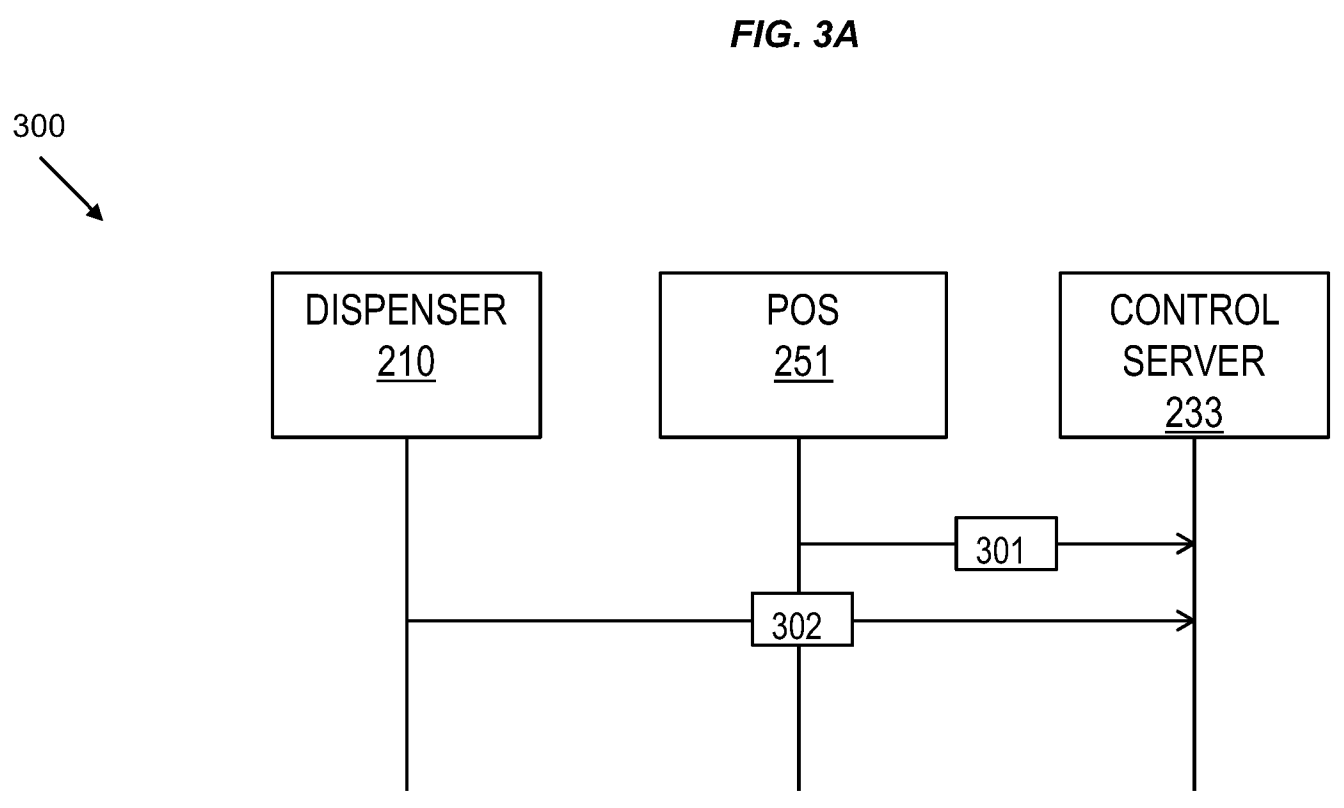

FIG. 3A is a data flow diagram 300 that illustrates the transfer of one or more of the types of data described herein between system components described in FIG. 2 and in accordance with some implementations of the current subject matter. In particular, data flow diagram illustrates the transfer of data when the system 200 is initialized to begin operations. Referring to FIGS. 2 and 3A, in order to initialize the system 200, at 301, the POS device 251 can transmit a site initialization signal to the control server 233. The site initialization signal can include data that characterizes an indication, for use by one or more of the aforementioned components of system 200, that the components of the fueling station at which the fuel dispenser 210 and the POS device 251 is located (such as the components of the on-site store 250) are operational and ready to begin a session. At 302, the fuel dispenser 210 can transmit a fueling point initialization signal to the control server 233. Similar to the site initialization signal, the fueling point initialization signal can include data that characterizes an indication, for use by one or more of the aforementioned components of system 200, that the fuel dispenser 210 is operational and ready to begin a session.

Figure 3B:
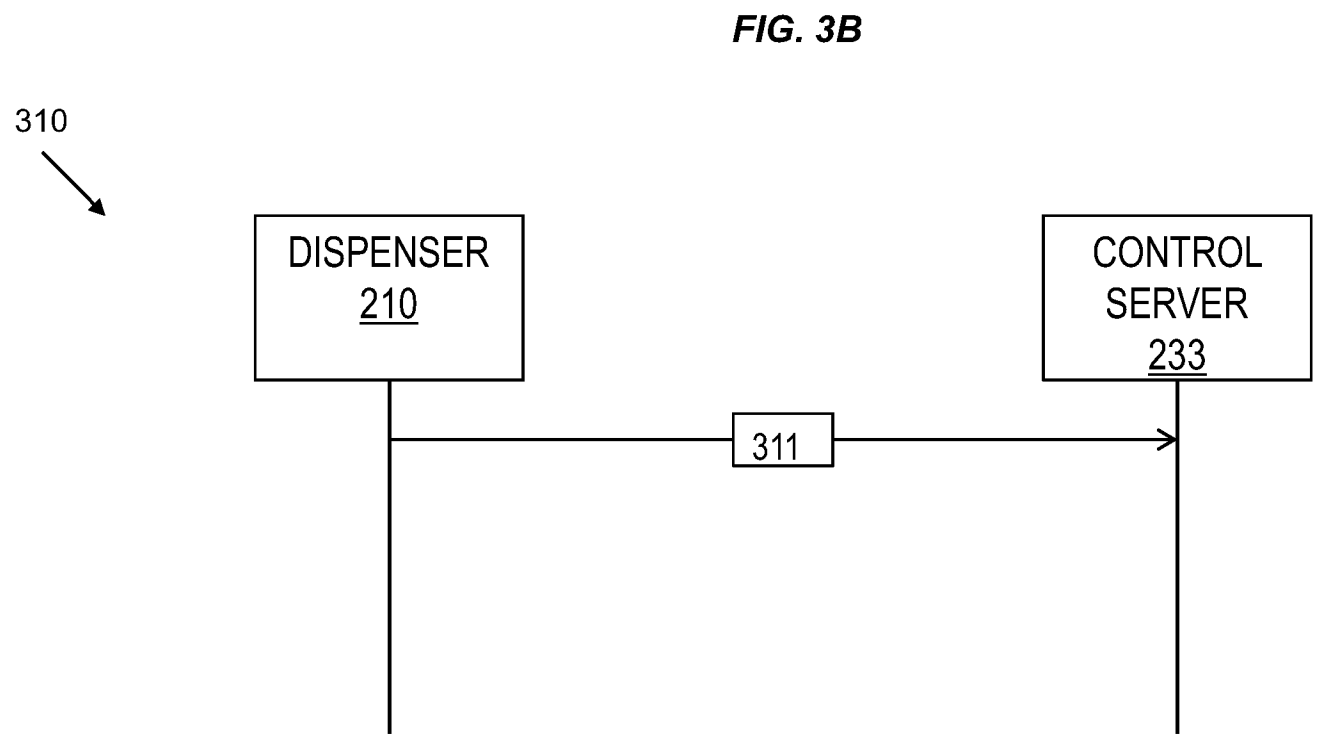

FIG. 3B is a data flow diagram 310 that illustrates the transfer of one or more of the types of data described herein between system components described in FIG. 2 and in accordance with some implementations of the current subject matter. In particular, data flow diagram 310 illustrates the flow of data after the system 200 has been initialized and during the period time in which the system 200 is waiting for the fuel dispenser user to engage the fuel dispenser 210 to begin a session. Referring to FIGS. 2 and 3B, after the fuel dispenser 210 has generated a unique identifier that identifies the session to be initiated, and after the fuel dispenser 210 has generated a three-dimensional barcode characterizing the unique identifier, a fueling point identifier that identifies the fuel dispenser 210 relative to the fueling station, a site identifier that identifies the fueling station, and a uniform resource locator (URL) characterizing the web server 231, at 311, the fuel dispenser 210 can transmit data characterizing the unique identifier to the control server 233.

Figure 3C:
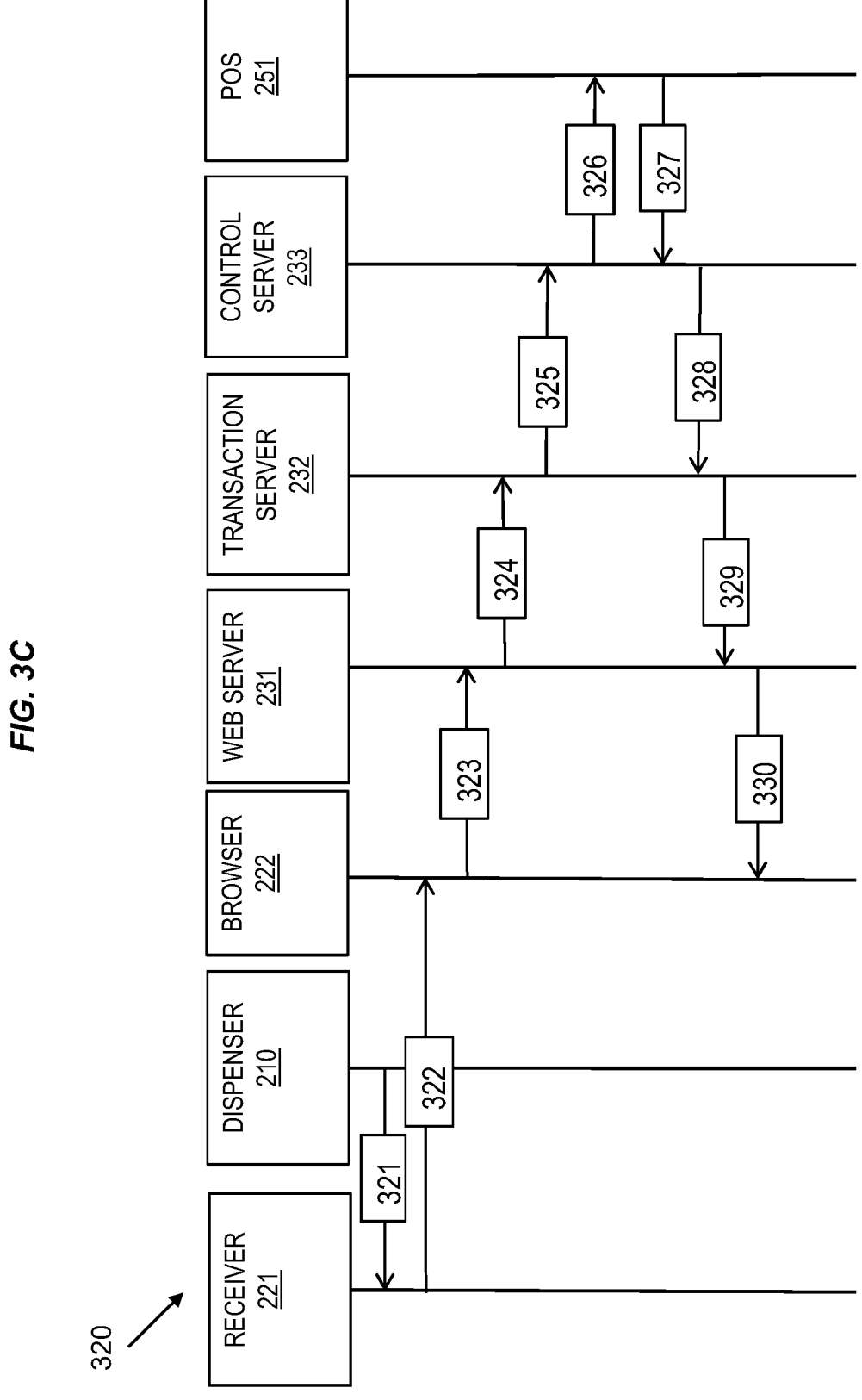
FIG. 3C is a data flow diagram illustrating the transfer of data between the system components illustrated in FIG. 2 during the initialization of the session.

FIG. 3C is a data flow diagram 320 that illustrates the transfer of one or more of the types of data described herein between system components described in FIG. 2 and in accordance with some implementations of the current subject matter. In particular, data flow diagram 320 illustrates the transfer of data during the initialization of the session. Referring to FIGS. 2 and 3C, at 321, the receiver 221 of the client device 220 can acquire the aforementioned three-dimensional barcode from the fuel dispenser 210, for example, by acquiring an image of the three-dimensional barcode when depicted on the display of the fuel dispenser

210. At 322, the receiver 221 can decode the URL and the unique identifier from the three-dimensional barcode and provide the URL and the unique identifier to the browser 222 of the client device 210. At 323, the browser 222 can connect to the web server 231 using the URL received from the receiver 221 and provide the unique identifier to the web server 231. At 324, the unique identifier can be provided from the web server 231 to the transaction server 232. The transaction server 232 can temporarily store the unique identifier for the duration of the session. At 325, the transaction server 232 can provide the unique identifier to the control server 233 for comparison with the copy of the unique identifier that was previously provided to the control server 233 by the fuel dispenser 210. If the control server 233 determines that the unique identifier received from the transaction server 232 matches the copy of the unique identifier provided to the control server 233 by the fuel dispenser 210, at 326, the control server 233 transmits a request to reserve the fuel dispenser 210 for the session to the POS device 251. If the fuel dispenser 210 is available to be reserved for the session, at 327, the POS device 251 transmits a response indicating that the fuel dispenser 210 has been reserved for the session to the control server 233. The control server 233 then generates data indicating that the fuel dispenser 210 has been reserved for the session and, at 328, can transmit the generated data to the transaction server 232. The transaction server 232 can then populate a content template with data characterizing the fuel dispenser 210, the session, and fuel dispensing parameters. At 329, the transaction server 232 can provide the populated content template to the web server 231. In response to receiving the populated content template, the web server 231 can, at 330 provide the populated content template to the browser 222 for presentation in graphical interface 223. The user can then interact with graphical interface 223 to select and/or input their desired fuel dispensing parameters (including their desired payment amount and/or amount of fuel), desired products and/or services available for sale at the on-site store 250, and/or desired fuel additives.

Figure 3D:
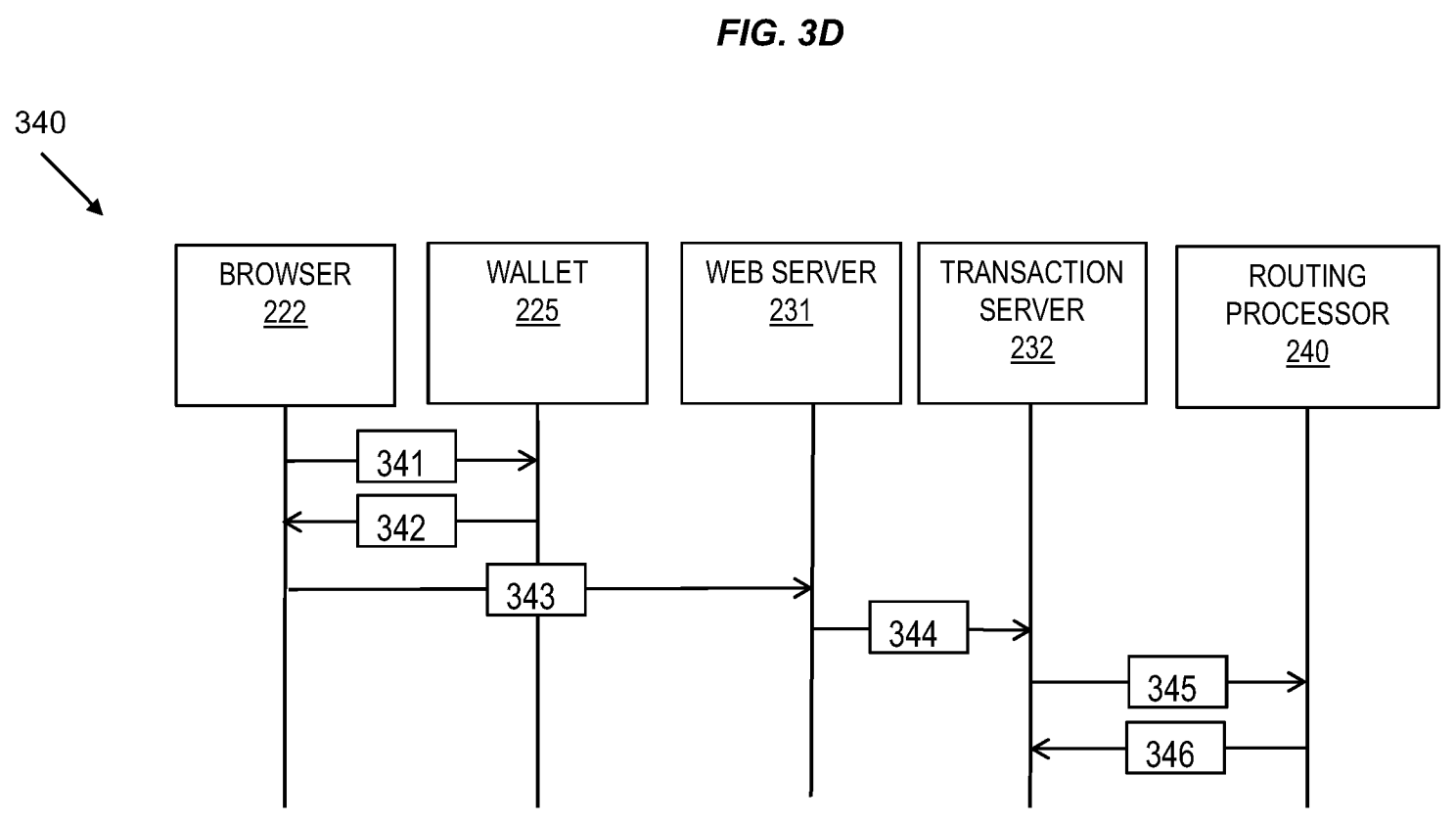

FIG. 3D is a data flow diagram 340 that illustrates the transfer of one or more of the types of data described herein between system components described in FIG. 2 and in accordance with some implementations of the current subject matter. In particular, data flow diagram 340 illustrates the transfer of data during the authorization of the transaction that occurs during the session. Referring to FIGS. 2 and 3D, after the user has provided the aforementioned inputs/selections to the graphical interface via browser 222, and after the user has selected a method of payment for the transaction by interacting with the graphical interface, the browser 222, at 341, can request a token from the digital wallet 225 that characterizes the method of payment stored on the client device 220. After the wallet 225 has requested and received authentication (in the form of a security credential, such as those described elsewhere herein) from the user to provide the token, at 342, the wallet 225 can provide the token to the browser 222. In response to receiving the payment token, the browser 222 can, at 343, provide the payment token, the fuel dispensing parameters, the desired products and/or services, and the desired fuel additives to the web server 231. At 344, the web server 231 can provide the payment token, the fuel dispensing parameters, the desired products and/or services, and the desired fuel additives to transaction server 232, which can generate a payment authorization request using the received payment token and that includes an authorized purchase amount that corresponds to the cost of the desired fuel, the desired products and/or services, and the desired fuel additives.

In some implementations, wherein the customer has provided, as an input to the graphical interface provided by the browser 222, a desired volume of fuel, the transaction server 232 can also query the control server 233 to determine the price of the highest grade of fuel available at the fuel dispenser 210. In response to receiving the price of the highest grade of fuel available at the fuel dispenser 210 from the control server 233, the transaction server 232 can calculate a maximum monetary value of the fuel portion of the transaction that is based on the received price of the highest grade of fuel. The transaction server 232 can use the maximum monetary value in determining the authorized purchase amount included in the payment authorization request.

At 345, the transaction server 232 provides the payment authorization request to the routing processor 240. After the routing processor 240 determines that the account of the user that is associated with the payment token at the payment-issuing bank has sufficient funds available to cover the authorized purchase amount, which includes the cost of the desired fuel, additives, products, and/or services, the routing processor 240 can generate a confirmation instruction that includes data characterizing the authorized purchase amount and indicating that sufficient funds are available and that the transaction can proceed. And, at 346, the routing processor 240 can transmit the confirmation instruction to the transaction server 232.

In some implementations, wherein the user has provided, as an input to the graphical interface provided by the browser 222, loyalty program information characterizing the user's participation in a loyalty program, the transaction server 232 can query the routing processor 240 to ascertain whether the provided loyalty program information matches an existing loyalty rewards account and whether there are any promotional offers/discounts on the products/services being purchased during the session that are available to the user based on the schema of the loyalty program. If the provided loyalty program information matches an existing loyalty rewards account, and/or if promotional offers/discounts are available to the user, the routing processor 240 can generate and transmit data that characterizes the loyalty rewards account and/or the available promotional offers/discounts to the transaction server 232. Similarly, in some implementations, wherein the loyalty program is maintained on the loyalty server 234, the transaction server 232 can query the loyalty server 234 to ascertain whether the provided loyalty program information matches an existing loyalty rewards account and whether there are any promotional offers/discounts on the products/services being purchased during the session that are available to the user based on the schema of the loyalty program. If the provided loyalty program information matches an existing loyalty rewards account, and/or if promotional offers/discounts are available to the user, the loyalty server 234 can generate and transmit data that characterizes the loyalty rewards account and/or the promotional offers/discounts to the transaction server 232.

FIG. 3E is a data flow diagram 350 that illustrates the transfer of one or more of the types of data described herein between system components described in FIG. 2 and in accordance with some implementations of the current subject matter. In particular, data flow diagram 350 illustrates the transfer of data during the authorization of the fuel dispensing operation that occurs during the session. Referring to FIGS. 2 and 3E, after the confirmation instruction has been provided to the transaction server 232 from the routing processor 240, the transaction server 232 can generate an initialization instruction that includes data characterizing the authorized purchase amount and instructions to initialize the fuel dispenser 210 for delivery of fuel. In some implementations, wherein the transaction server 232 has received data from the routing processor 240 and/or loyalty server 234 pertaining to available promotional offers/discounts associated with the products and/or services being purchased, the initialization instruction can include any changes to the standard pricing of the products and/or services being purchased. Such changes can be determined by the transaction server 232 based on the aforementioned data received from the routing processor 240 and/or the loyalty server 234.

In some implementations, the user can order products and/or services, such as convenience store items, by interacting with the web server 231 via the browser 222 after the confirmation instruction has been received from the routing processor 240 and after the initialization instruction has been generated by the transaction server 232. In such an occurrence, an additional authorization of a secondary transaction for the additional products and/or services can be made. In some implementations, the initialization instruction can be modified by reducing the authorized purchase amount that is included in the initialization instruction in order to account for the additional cost of the additional products and/or services, thereby obviating the need to obtain an additional authorization for the additional products and/or services.

At 351, initialization instruction can be provided to the control server 233, which can generate a fuel authorization instruction based on the received initialization instruction. The fuel authorization instruction can include data characterizing instructions for the fuel controller 260 to activate the fuel dispenser 210 for fuel delivery and data characterizing the aforementioned changes to the standard pricing of the products and/or services being purchased. At 352, the fuel authorization instruction can be transmitted to the POS device 251, which can transmit the fuel authorization instruction to the forecourt controller 252 at 353. At 354, the forecourt controller 252 can transmit the fuel authorization instruction to the fuel controller 260, which can cause the fuel controller 260 to activate the fuel dispenser 210 for fuel delivery by generating and sending initialization instructions to the fuel delivery components of the fuel dispenser 210 at 355. When the fuel authorization instruction is transmitted to the POS device 251, the POS device 251 can update an operational status of the fuel dispenser 210 that is stored on the POS device 251 to indicate that the fuel dispenser 210 is engaged in a fuel transaction. As a result, any other systems at the fueling station that are configured to initialize fuel transactions at the fuel dispenser 210, and that are in operable communication with the POS device 251, are prevented from successfully initializing a transaction at the fuel dispenser 210. Similarly, when the fuel authorization instruction is transmitted to the forecourt controller 252, the forecourt controller 252 can update an operational status of the fuel dispenser 210 that is stored on the forecourt controller 252 to indicate that the fuel dispenser 210 is engaged in a fuel transaction. As a result, any other systems at the fueling station that are configured to initialize fuel transactions at the fuel dispenser 210, and that are in operable communication with the forecourt controller 252, are prevented from successfully initializing a transaction at the fuel dispenser 210. However, in some implementations, wherein the fueling station lacks any additional systems for initializing fuel transactions at the fuel dispenser 210, the control server 233 can transmit the fuel authorization instruction directly to the fuel controller 260.

Once the fuel controller 260 has activated the fuel dispenser 210 for fuel delivery, the fuel controller 260 can generate signal data that indicates that the fuel dispenser 210 has been activated, and the fuel controller 260 can transmit the signal data to the POS device 251 at 356. At 357, the POS device 251 can transmit the signal data to the control server 233, which can generate a display command characterizing a prompt to instruct the user to proceed with fueling (e.g., lift nozzle, select grade, begin fueling, etc.). At 358, the control server 233 can provide the display command to the fuel dispenser 210, which can generate a graphical representation of the prompt and display the graphical representation of the prompt on the display of the fuel dispenser 210. In some implementations, the control server 233 can, at 359, provide the display command to the transaction server 232, which can provide the display command to the web server 231 at 360. The web server 231 can generate a graphical representation of the prompt and provide the graphical representation of the prompt for presentation in the browser 222 of the client device 220 at 361.

Figure 3F:
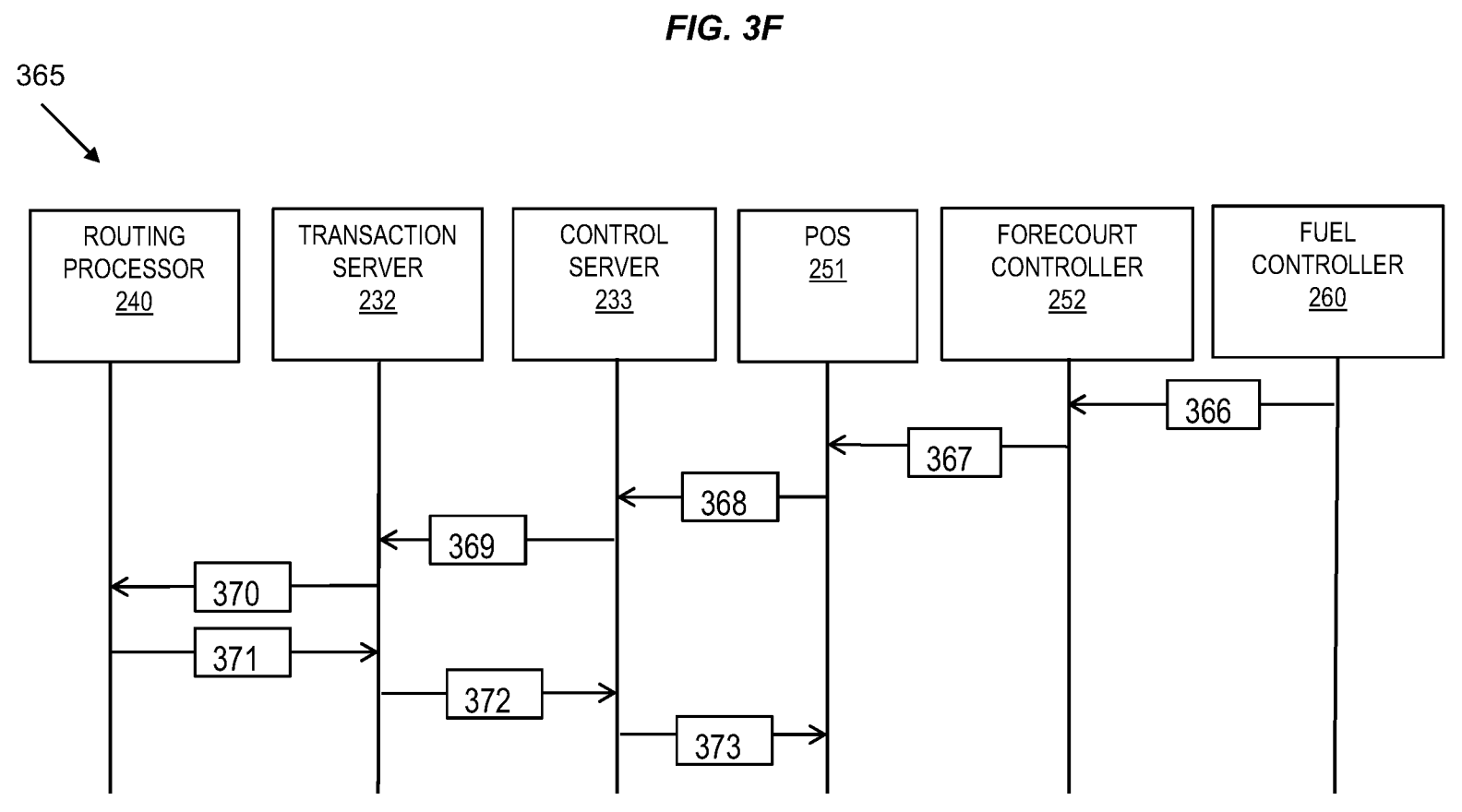

FIG. 3F is a data flow diagram 365 that illustrates the transfer of one or more of the types of data described herein between system components described in FIG. 2 and in accordance with some implementations of the current subject matter. In particular, data flow diagram 365 illustrates the transfer of data after fueling has been completed. Referring to FIGS. 2 and 3F, once fueling has been completed in accordance with the fuel authorization instruction, the fuel controller 260 generates finalization data characterizing a notification that fueling has been completed, the volume of fuel dispensed by the fuel dispenser 210, and a price per unit volume of the fuel dispensed. At 366, the fuel controller 260 transmits the finalization data to the forecourt controller 252. At 367, the forecourt controller 252 can transmit the finalization data to the POS device 251. The POS device 251 can generate data characterizing a request to finalize the transaction and provide the generated request, at 368, to the control server 233. However, in some implementations, the fuel controller 260 may provide the finalization data directly to the control server 233, which can generate the data characterizing the request to finalize the transaction. The control server 233 can, at 369, provide the generated request to the transaction server 232, which can apply any promotional offers/discounts that are applicable in accordance with the aforementioned loyalty program data and provide the generated request to the routing processor 240 at 370. The routing processor 240 can finalize the transaction to effect payment for the dispensed fuel to the merchant bank associated with the fueling station. The routing processor 240 can generate a notification that the transaction has been finalized, and, at 371, the routing processor 240 can provide the notification to the transaction server 232. The transaction server can, at 372, provide the notification to the control server 233. The control server 233 can, at 373, provide the notification to the POS device 251. The POS device 251 can then finalize the transaction and end the session.

Figure 3G:
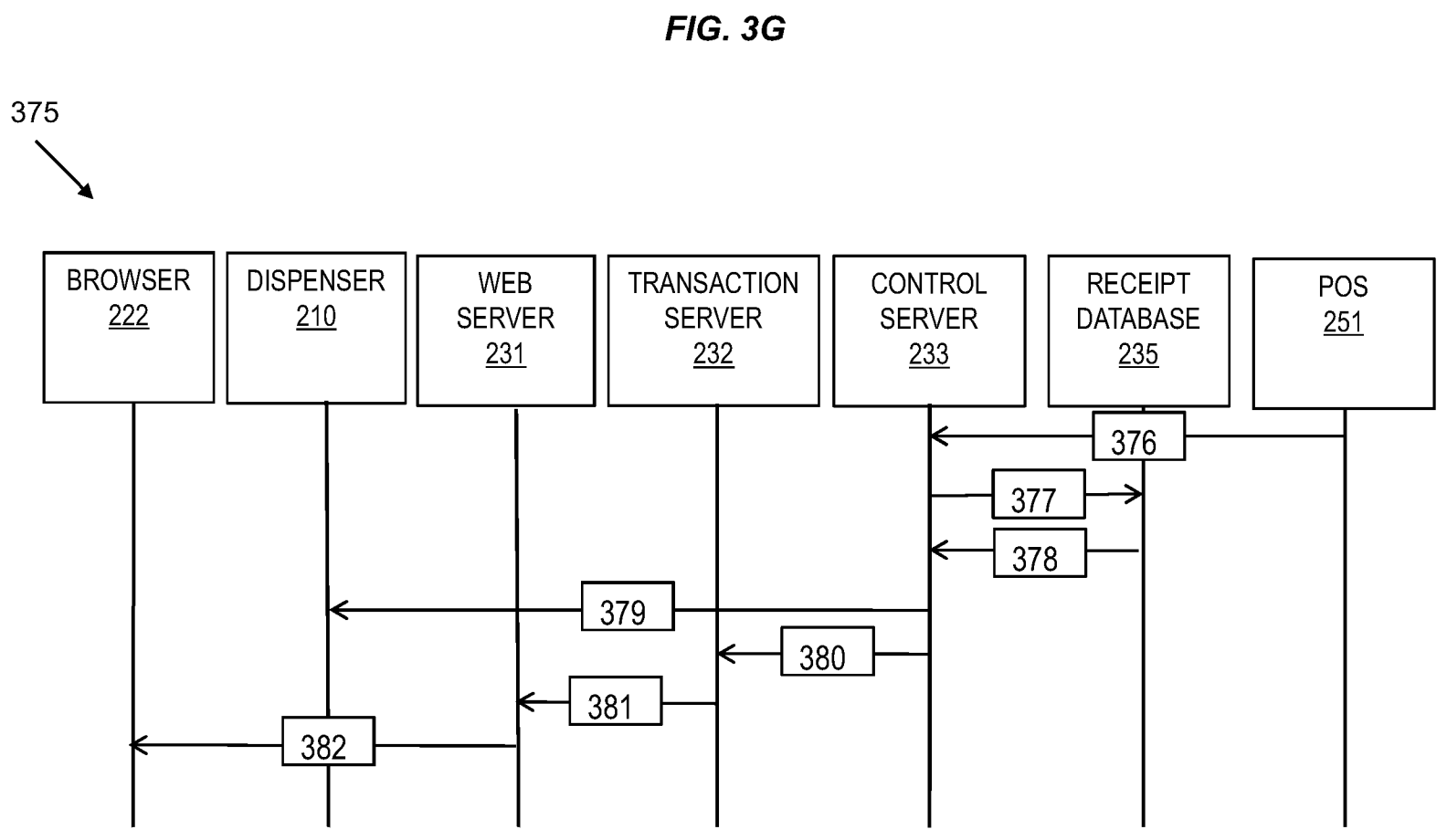

FIG. 3G is a data flow diagram 375 that illustrates the transfer of one or more of the types of data described herein between system components described in FIG. 2 and in accordance with some implementations of the current subject matter. In particular, data flow diagram 375 illustrates the transfer of data when a receipt characterizing the transaction that occurred during the session is provided to the client device. Referring to FIGS. 2 and 3G, after the transaction has been finalized, the POS 251 can, at 376, transmit receipt data characterizing a record of the completed session to the control server 233. The control server 233 can, at 377, transmit the receipt data to the receipt database 235, which can store the receipt data. In response to receiving the receipt data from the control server, the receipt database 235 can generate a path that characterizes a location of the receipt data in the receipt database 235 and transmit the path to the control server 233 at 378. The control server 233 can, at 379, transmit the receipt data to the fuel dispenser 210 for display on the display of the fuel dispenser 210 and viewing by the user. In addition, the control server 233 can, at 380, transmit the receipt data and the path to the transaction server 232, and the transaction server 232 can, at 381, transmit the receipt data and the path to the web server 231. The web server 231 can generate a graphical depiction of the receipt data and the link, at 382, provide the graphical depiction to the browser 222 for depiction on the display of the client device 210.

Figure 5:
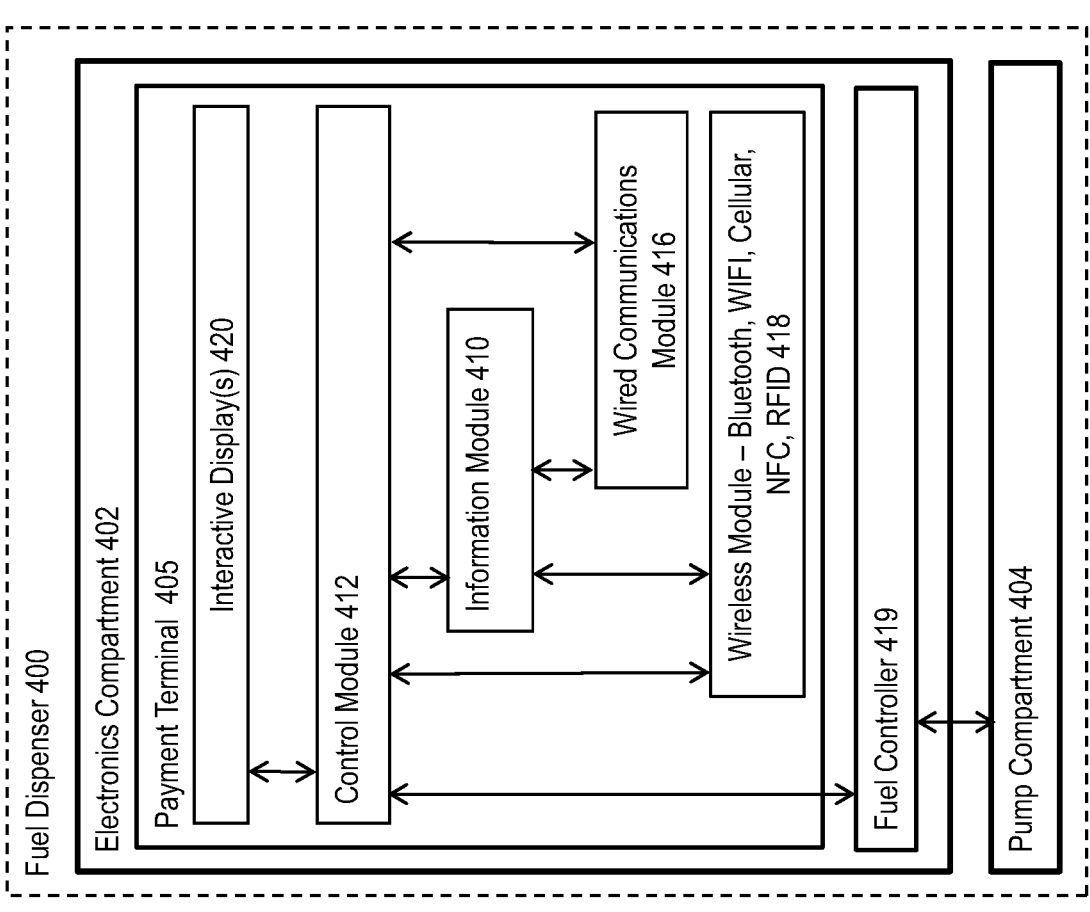
FIG. 5 is a diagram showing internal components of the fuel dispenser of FIGS. 4A and 4B.

FIGS. 4A and 4B illustrate one embodiment of a fuel dispenser 400 that can be used in some implementations of the current subject matter, and FIG. 5 illustrates components of the fuel dispenser. In general, the fuel dispenser 400 includes an electronics compartment 402 and a pump compartment 404. The pump compartment 404 houses a pump configured to pump fuel from a fuel tank or other reservoir, as well as one or more meters that can be configured to monitor fuel flow, flow of fuel additives, and/or flow of other components of the fuel. The pump compartment 404 can also include other components to facilitate fuel dispensing and mixing, such as motors and valves, a strainer/filtering system, a vapor recovery system, and the like. The pump compartment 404 is isolated from the electronics compartment 402 within the fuel dispenser 400 to facilitate safety, security, and/or maintenance, as will be appreciated by a person skilled in the art. Fuel is thus not allowed to flow from the pump compartment 404 to the electronics compartment 302 and instead flows from the pump compartment 404 through hoses 406 to nozzles 408 for dispensing. As will be appreciated by a person skilled in the art, the nozzles 408 are each configured to dispense fuel from the fuel dispenser 400 as pumped therefrom by the pump.

The electronics compartment 402 houses electronics for facilitating payment for fuel and for facilitating the dispensing of the fuel. For example, the electronics compartment 402 can include a fuel controller 419 that, at least in some implementations, includes a data processor, memory, and storage forming part of at least one computing system. The fuel controller 419 is configured to control dispensing of the fuel from the pump compartment 404. The electronics compartment 402 also includes a payment terminal 405 that is configured to provide a user with one or more options to create a desired fuel mixture, receive instructions characterizing the desired fuel mixture, receive payment information and/or user identification information from a user, transmit and receive the payment information and/or the user identification information with a POS system via a forecourt controller, and deliver fueling instructions to the fuel controller 419 to dispense fuel. The payment terminal 405 can also be configured to provide a user with information related to a status of fueling. For example, the payment terminal can display an amount of fuel that has been dispensed, and a corresponding fuel cost as the fuel mixture is dispensed.

The payment terminal 405 can be configured to facilitate communication between a user and the fuel controller 419, and can include an interactive display 420 and an information module 410. The information module 410 can, at least in some implementations include a data processor, memory, and storage, forming part of at least one computing system. The payment terminal 405 can also include one or more wired communication modules 416 and/or wireless communication modules 418 and a control module 412 that, at least in some implementations includes a data processor, memory, and storage, forming part of at least one computing system. The communication modules 416, 418 can function to allow data to be transmitted to and from various components within the payment terminal 405 via wired and/or wireless communication, respectively. For example, the communication modules 416, 418 can be configured to transmit and receive signals that can characterize, e.g., payment information, user identification information, and/or information regarding a desired fuel selection, via wired and/or wireless communications, respectively. The wireless communication module 418 can include, e.g., a transceiver for communicating via Bluetooth protocol, cellular protocol, WI-FI protocol, near field communication (NFC), and/or a radio frequency identification (RFID) protocol. Wired and/or wireless communication via the communication modules 416, 418 can be according to any of a variety of communication protocols, e.g., TCP/IP, etc., as will be appreciated by a person skilled in the art.

The interactive display 420, which can be, or can include, a touchscreen. The interactive display 420 can be operably coupled to the control module 412 which can be used to control, dynamically rearrange, and/or update a graphical user interface (GUI) rendered on the display 420. The display 420 can be configured to show information (e.g., media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 412 to be processed. Some examples of information that the display 420 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select. In some implementations, the interactive display 420 can be configured to display a three-dimensional barcode, such as a QR code, in accordance with the functionality described elsewhere herein.

The subject matter described herein can provide several advantages. In some implementations, by using the functionality and components described above, a customer can complete a fueling station transaction without having to provide payment information to a fuel dispenser or a convenience store at the fueling station, which can eliminate the risk of theft of the customer's payment information via such devices as payment information skimmers. In addition, in some implementations, the functionality described can provide a process for managing the operation of a fuel dispenser operations management that minimizes the required amount of physical contact with the fuel dispenser, thereby reducing the risk of disease transmission associated with fuel dispenser operations. In addition, in some implementations the methodology can provide a centralized, streamlined architecture that implements mobile-device-based management of fuel dispenser operations without requiring substantial customization/retrofitting of existing fueling station hardware/software architectures to accommodate mobile-device based fuel dispenser operations management. The functionality described herein also provides for improved transaction speed as compared to conventional payment and fuel dispenser operations methods, and can allow for a centralized method of receiving payment for fuel dispensed in fuel dispensing transactions that does not require the use of existing payment networks that coordinate payment to fueling stations.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:

receiving, from a fuel dispenser and by a client device of a user of the fuel dispenser, data characterizing a session during which fuel is to be dispensed from the fuel dispenser, the client device separate from the fuel dispenser;

receiving a fuel dispensing parameter characterizing an operational parameter of the fuel dispenser for configuring an operation of the fuel dispenser during the session, the fuel dispensing parameter includes a fuel type, a fuel grade, and/or a volume of fuel to be dispensed, the fuel dispensing parameter received at a field of a graphical interface, the graphical interface depicted on a display of the client device and determined by the client device based on the received session data;

determining a token characterizing an account associated with the user for initializing the dispensing of the fuel during the session;

authorizing the initialization of the dispensing of the fuel from the fuel dispenser by providing the token and the fuel dispensing parameter to a routing processor separate from the fuel dispenser and the client device, receiving, from the routing processor, a confirmation instruction based on the provided token and the provided fuel dispensing parameter, the confirmation instruction indicating that the account contains sufficient funds to pay for the fuel to be dispensed in accordance with the fuel dispensing parameter and that the initialization of the dispensing of the fuel is authorized, and determining an initialization instruction in response to receiving the confirmation instruction, the initialization instruction characterizing instructions for configuring the operational parameter of the fuel dispenser based on the fuel dispensing parameter, such that the fuel dispenser is configured for the dispensing of the fuel; and providing the initialization instruction and the fuel dispensing parameter to the fuel dispenser, which causes the fuel dispenser to be configured according to the fuel dispensing parameter and enables the fuel dispenser to dispense the fuel.

2. The method of claim 1, wherein the graphical interface includes a prompt to input the fuel dispensing parameter into the field, and further comprising providing the graphical interface to the display of the client device.

3. The method of claim 1, wherein the fuel dispensing parameter includes at least one of a desired amount of payment for the fuel, a desired fuel additive, a desired product/service for sale, and data characterizing a loyalty program.

4. The method of claim 1, wherein the session data includes a unique identifier that identifies the session, a fueling station unique identifier characterizing a fueling station at which the fuel dispenser is located, and a fueling point unique identifier characterizing a position of the fuel dispenser relative to the fueling station, wherein the session is characterized by a three-dimensional barcode determined by the fuel dispenser and depicted on a display of the fuel dispenser, wherein the client device is configured to receive the three-dimensional barcode and to decode the session data from the received three-dimensional barcode.

5. The method of claim 3, further comprising:

determining a retrieval three-dimensional barcode characterizing instructions to cause an authorization of retrieval of the desired product/service for sale; and providing the retrieval three-dimensional barcode to the client device.

6. The method of claim 1, wherein the token is requested from a digital payment database of the client device, and the token is provided by the client device based on an authentication of the fuel dispenser user determined by the client device.

7. The method of claim 1, further comprising:

after the fuel dispenser has completed the dispensing of the fuel:

receiving finalization request data characterizing a request to finalize the session;

determining finalization instructions based on the received finalization request data, the finalization instructions determined in response to receipt of finalization data indicating that the session has been completed; and providing the finalization instructions to a fueling station terminal in operable communication with the fuel dispenser to cause the fueling station terminal to indicate that the session has been completed.

8. The method of claim 7, further comprising:

receiving receipt data characterizing a record of the completed session;

determining a graphical representation of the receipt data for inclusion in the graphical interface; and providing the graphical representation of the receipt data to the client device for depiction in the graphical interface.

9. The method of claim 8, further comprising:

storing the received receipt data in a receipt database;

determining a path characterizing a location of the receipt data stored in the receipt database; and providing the path to the client device for depiction in the graphical interface.

10. The method of claim 9, further comprising:

receiving a transmission request characterizing a request to provide the stored receipt data to an external server;

determining an external receipt record based on the received transmission request, the external receipt record including the stored receipt data; and providing the external receipt record to the external server.

11. The method of claim 9, further comprising:

determining a receipt report characterizing the received receipt data and additional receipt data previously stored in the receipt database; and providing the receipt report to the fueling station terminal, the fueling station terminal having a graphical user interface configured to display the receipt report.

12. The method of claim 4, wherein the fuel dispenser forms a part of a plurality of associated fuel dispensers having associated sessions, and the unique identifier identifying the session from a plurality of sessions.

13. A system comprising:

at least one data processor; and memory storing instructions configured to cause the at least one data processor to perform operations comprising:

receiving, from a fuel dispenser and by a client device of a user of the fuel dispenser, data characterizing a session during which fuel is to be dispensed from the fuel dispenser, the client device separate from the fuel dispenser;

receiving a fuel dispensing parameter characterizing an operational parameter of the fuel dispenser for configuring an operation of the fuel dispenser during the session, the fuel dispensing parameter includes a fuel type, a fuel grade, and/or a volume of fuel to be dispensed, the fuel dispensing parameter received at a field of a graphical interface, the graphical interface depicted on a display of the client device and determined by the client device based on the received session data;

determining a token characterizing an account associated with the user for initializing the dispensing of the fuel during the session;

authorizing the initialization of the dispensing of the fuel from the fuel dispenser by providing the token and the fuel dispensing parameter to a routing processor separate from the fuel dispenser and the client device, receiving, from the routing processor, a confirmation instruction based on the provided token and the provided fuel dispensing parameter, the confirmation instruction indicating that the account contains sufficient funds to pay for the fuel to be dispensed in accordance with the fuel dispensing parameters and that the initialization of the dispensing of the fuel is authorized, and determining an initialization instruction in response to receiving the confirmation instruction, the initialization instruction characterizing instructions for configuring the operating parameter of the fuel dispenser based on the fuel dispensing parameter, such that the fuel dispenser is configured for the dispensing of the fuel; and providing the initialization instruction and the fuel dispensing parameter to the fuel dispenser, which causes the fuel dispenser to be configured according to the fuel dispensing parameter and enables the fuel dispenser to dispense the fuel.

14. The system of claim 13, wherein the operations further comprise providing the graphical interface to the display of the client device, and wherein the graphical interface includes a prompt to input the fuel dispensing parameter into the field.

15. The system of claim 13, wherein the fuel dispensing parameter includes at least one of a desired amount of payment for the fuel, a desired fuel additive, a desired product/service for sale, and data characterizing a loyalty program.

16. The system of claim 13, wherein the session data includes a unique identifier that identifies the session, a fueling station unique identifier characterizing a fueling station at which the fuel dispenser is located, and a fueling point unique identifier characterizing a position of the fuel dispenser relative to the fueling station, wherein the session is characterized by a three-dimensional barcode determined by the fuel dispenser and depicted on a display of the fuel dispenser, wherein the client device is configured to receive the three-dimensional barcode and to decode the session data from the received three-dimensional barcode.

17. The system of claim 15, wherein the operations further comprise:

determining a retrieval three-dimensional barcode characterizing instructions to cause an authorization of retrieval of the desired product/service for sale; and providing the retrieval three-dimensional barcode to the client device.

18. The system of claim 13, wherein the token is requested from a digital payment database of the client device, and the token is provided by the client device based on an authentication of the fuel dispenser user determined by the client device.

19. The system of claim 13, wherein the operations further comprise:

after the fuel dispenser has completed the dispensing of the fuel:

receiving finalization request data characterizing a request to finalize the session;

determining finalization instructions based on the received finalization request data, the finalization instructions determined in response to receipt of finalization data indicating that the session has been completed; and providing the finalization instructions to a fueling station terminal in operable communication with the fuel dispenser to cause the fueling station terminal to indicate that the session has been completed.

20. The system of claim 19, wherein the operations further comprise:

receiving receipt data characterizing a record of the completed session;

determining a graphical representation of the receipt data for inclusion in the graphical interface; and providing the graphical representation of the receipt data to the client device for depiction in the graphical interface.

21. The system of claim 20, wherein the operations further comprise:

storing the received receipt data in a receipt database;

determining a path characterizing a location of the receipt data stored in the receipt database; and providing the path to the client device for depiction in the graphical interface.

22. The system of claim 21, wherein the operations further comprise:

receiving a transmission request characterizing a request to provide the stored receipt data to an external server;

determining an external receipt record based on the received transmission request, the external receipt record including the stored receipt data; and providing the external receipt record to the external server.

23. The system of claim 21, wherein the operations further comprise:

determining a receipt report characterizing the received receipt data and additional receipt data previously stored in the receipt database; and providing the receipt report to the fueling station terminal, the fueling station terminal having a graphical user interface configured to display the receipt report.

24. The system of claim 16, wherein the fuel dispenser forms a part of a plurality of associated fuel dispensers having associated sessions, and the unique identifier identifying the session from a plurality of sessions.

25. A non-transitory computer program product storing instructions which, when executed by at least one data processor forming part of at least one computing system, cause the at least one data processor to implement operations comprising:

receiving, from a fuel dispenser and by a client device of a user of the fuel dispenser, data characterizing a session during which fuel is to be dispensed from the fuel dispenser, the client device separate from the fuel dispenser;

receiving a fuel dispensing parameter characterizing an operational parameter of the fuel dispenser for configuring an operation of the fuel dispenser during the session, the fuel dispensing parameter includes a fuel type, a fuel grade, and/or a volume of fuel to be dispensed, the fuel dispensing parameter received at a field of a graphical interface, the graphical interface depicted on a display of the client device and determined by the client device based on the received session data;

determining a token characterizing an account associated with the user for initializing the dispensing of the fuel during the session;

authorizing the initialization of the dispensing of the fuel from the fuel dispenser by providing the token and the fuel dispensing parameter to a routing processor separate from the fuel dispenser and the client device, receiving, from the routing processor, a confirmation instruction based on the provided token and the provided fuel dispensing parameter, the confirmation instruction indicating that the account contains sufficient funds to pay for the fuel to be dispensed in accordance with the fuel dispensing parameter and that the initialization of the dispensing of the fuel is authorized, and determining an initialization instruction in response to receiving the confirmation instruction, the initialization instruction characterizing instructions for configuring the operational parameter of the fuel dispenser based on the fuel dispensing parameter, such that the fuel dispenser is configured for the dispensing of the fuel; and providing the initialization instruction and the fuel dispensing parameter to the fuel dispenser, which causes the fuel dispenser to be configured according to the fuel dispensing parameter and enables the fuel dispenser to dispense the fuel.

* * * * *